United States Patent [19]

Zeigler

[11] Patent Number: 4,926,158
[45] Date of Patent: May 15, 1990

[54] POWERED COMMUNICATION LINK

[76] Inventor: John R. Zeigler, 17990 SW. Frances St., Aloha, Oreg. 97006

[21] Appl. No.: 305,871

[22] Filed: Feb. 1, 1989

[51] Int. Cl.$^5$ .................... H04M 11/04; G08B 26/00
[52] U.S. Cl. .................. 340/310 A; 340/505; 340/507; 340/310 R; 340/538; 340/518; 340/825.06; 340/870.39
[58] Field of Search ............... 340/505, 310 R, 310 A, 340/538, 518, 870.39, 825.06–825.13, 507

[56] References Cited

U.S. PATENT DOCUMENTS

| | | | |
|---|---|---|---|
| 4,093,946 | 6/1978 | Fowler | 340/505 |
| 4,144,528 | 3/1979 | Johnson, Sr. | 340/505 |
| 4,463,352 | 7/1984 | Forbes et al. | 340/505 |
| 4,468,655 | 8/1984 | Iwata | 340/505 |
| 4,535,401 | 8/1985 | Penn | 340/505 |
| 4,613,848 | 9/1986 | Watkins | 340/505 |
| 4,788,527 | 11/1988 | Johansson | 340/505 |

Primary Examiner—Donnie L. Crosland
Attorney, Agent, or Firm—Chernoff, Vilhauer, McClung & Stenzel

[57] ABSTRACT

A powered communications link between a central controller and a remote substation along a conductor that includes a movable or intermittent contact interacting therebetween includes a power supply located at the central controller for supplying electrical power over the conductor to the remote substation and an electrical power storage device at the remote substation for storing the power supplied over the conductor. Data and power are multiplexed over the conductor by the central controller which periodically stops the application of power to the conductors to permit a transmitter at the remote substation to send data to the central controller. A switch at the remote substation connects the power storage device to the conductor when power is being sent and disconnects it at all other times.

17 Claims, 5 Drawing Sheets

POWERED COMMUNICATION LINK

BACKGROUND OF THE INVENTION

The following invention relates to a communication system in which bidirectional communication is provided over a conductive link from a central controller to a remote substation wherein the central controller also provides power over the conductive link to the remote substation.

In some applications for communications systems having a central data processing controller linked by a single pair electrical conductor to a remote data processing substation, it is sometimes necessary to provide the remote substation with electrical power over the conductor on a time-shared basis with the data. This may include applications in which the remote station is movable along a track or rail where the track provides the conductive link for data transmission and reception. Since it is in motion, the remote data processing substation may not have available to it a source of power, and it is therefore necessary in such cases to provide power to the remote substation along with data over the single pair conductive link. Also, at times, the single pair conductive link may be of the type which is prone to intermittent open circuits. This can occur when the conductive link is in the form of a rail or track, or where the link must pass through a slip ring where electrical continuity is maintained by a contact bearing against the slip ring or track.

One example of an environment to which the invention relates is in a communications controller located on the steering wheel of an automobile which communicates with a central console located underneath the dashboard. Systems have been proposed for automobiles in which a communications input and display for controlling such automobile functions as a radio, tape deck or cellular radio telephone would include push buttons or contact pads to control various functions related thereto. For example, functions for a tape deck such as "play," "fast forward," or "reverse" as well as volume and tone controls have been located on the steering wheel to control the operation of a tape deck mounted in its usual location. A system generally of this type may be obtained from Blaupunkt and is known as a Blaupunkt-Rinspeed Intelligent Steering Wheel. The Blaupunkt system includes push buttons to operate an AM/FM cassette receiver, a CD player and a cellular radio telephone. In this system, however, communication from the steering wheel to the central console is via infrared links where the infrared transmitters in the wheel are powered by batteries. This is a disadvantage because of the need to change the batteries and because the batteries may run out of charge at inopportune times. This could be especially troublesome with a cellular radio telephone. Also the infrared link is one way communication only, and the remote control on the wheel is incapable of receiving data from the console.

In most automobiles, the only conductive link that extends through the steering wheel column is the horn wire with the column itself supplying the second conductive portion of the wire pair. The integrity of the horn wire is maintained by a contact and slip ring arrangement so that the steering wheel may be turned through any arc and still have the horn available. The idea of utilizing the horn link as both a communication link and a means for powering the remote data terminal has not been pursued in the past for the application described above because, given the low voltage nature of data pulses, and given the noise generated by the slip ring contact, communication from the remote data and display substation to the central data processing controller has been impractical. The slip ring contact is so noisy that the receivers at either end of the link interpret noise spikes as data pulses. Also digital communication can easily be lost, because although the slip ring contact is sufficient to maintain the integrity of the horn signal, which is a relatively high voltage and high current signal, the link would appear to be an intermittent connection to the microprocessors that would be needed at either end.

Another example of the environment in which the invention may be found is in a printer having a print head which must move along a pair of metal tracks. The print head must be powered from the metal tracks and must also receive data along this link from the printer. Another example is a model railroad. It is desirable in the case of a model railroad to power the locomotive as well as send data through the track. In the past the locomotive has not been able to send data back to the central controller, which would be a desirable feature. This data could include speed or distance travelled. The problem with attempting any more than the most elementary form of analog communication in any of these cases is the noise generated by the sliding contact.

SUMMARY OF THE INVENTION

The problems mentioned above are solved by the apparatus of the present invention which comprises a powered communication link between at least two data substations linked by a single pair conductor wherein a power supply is located at a central controller for supplying electrical power over the single pair conductor to a second or remote substation along with receiver/transmitter circuitry that discriminates against the noise generated by a sliding contact. The remote substation includes an electrical power storage circuit for storing the electrical power supplied over the conductor and also includes a data entry and display terminal powered by the electrical storage circuit. A computer at the central controller periodically stops the application of electrical power to the conductive link and sends data to and receives data from the remote substation. The data transmission thus alternates with the transmission of power, time-sharing the conductive link.

The pulsed nature of the power transmission requires that the power pulses be stored as charge in a storage device, such as a capacitor, and then provided to the remote data substation in the form of a DC voltage. In one embodiment of the invention, a voltage sensing circuit senses the amount of voltage provided by the storage device and sends a signal over the link from the remote data substation to the central controller indicating that more power is needed if this voltage drops below a threshold. The controller will then respond by adapting either the frequency or the period of the power pulses transmitted to the substation.

Each end of the communication link includes a pullup network which is operative upon any removal of power from the link for raising the potential of the link except in the presence of data, to prevent the false triggering of microprocessors located at both the remote substation and the central controller. This is necessary because the microprocessors at each end must be configured to accept a low level logic signal as the active signal in order to avoid confusion with the power pulses. When power is lost through the intermittent nature of the conductive link, it is important that the low level pulses produced at that time, which are actually noise, are not interpreted as data pulses by either microprocessor.

Both microprocessors include internally generated programs for controlling the communication protocol between central controller and remote substation. It is important that in the event of loss of communication, both microprocessors be capable of being reset to an initialized condition so that the program can start all over again without loss of data. Thus, the remote substation includes a timer for resetting its microprocessor in the event that no timing pulses are received within a preset period of time.

In some environments of the invention, particularly those in which the conductive link is the path for a signalling device such as a warning horn or light, a fail-safe switching circuit is provided which connects a switch which controls the signalling device directly to the conductive link in the event that communication between the remote substation and the central controller is lost. At all other times the status of the horn switch is communicated as a bit of information in the data transmission from the remote substation to the central controller.

It is the principal object of this invention to provide a powered two-way communication link between a central controller and a remote substation having no internal power source over a single pair conductor which may include an intermittent or noisy connection.

A further object of this invention is to provide a powered two-way data communication link over a single pair conductor in which power pulses and data pulses are multiplexed, and which includes an energy storage device at the remote substation for storing energy provided by the power pulses to provide the electrical power necessary to operate the substation.

A still further object of this invention is to provide a communication link over a single pair conductor between a central controller and a remote substation powered over the single pair conductor in which the energy level of a storage device at the remote substation is monitored and a signal is provided to the central controller indicating when more power is needed.

A still further object of this invention is to provide a powered communication link between a central controller and a remote substation in which the remote substation includes a signalling device and includes a fail safe circuit for connecting the signalling device with the communication link in the event of a failure of either the central controller or the remote substation.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
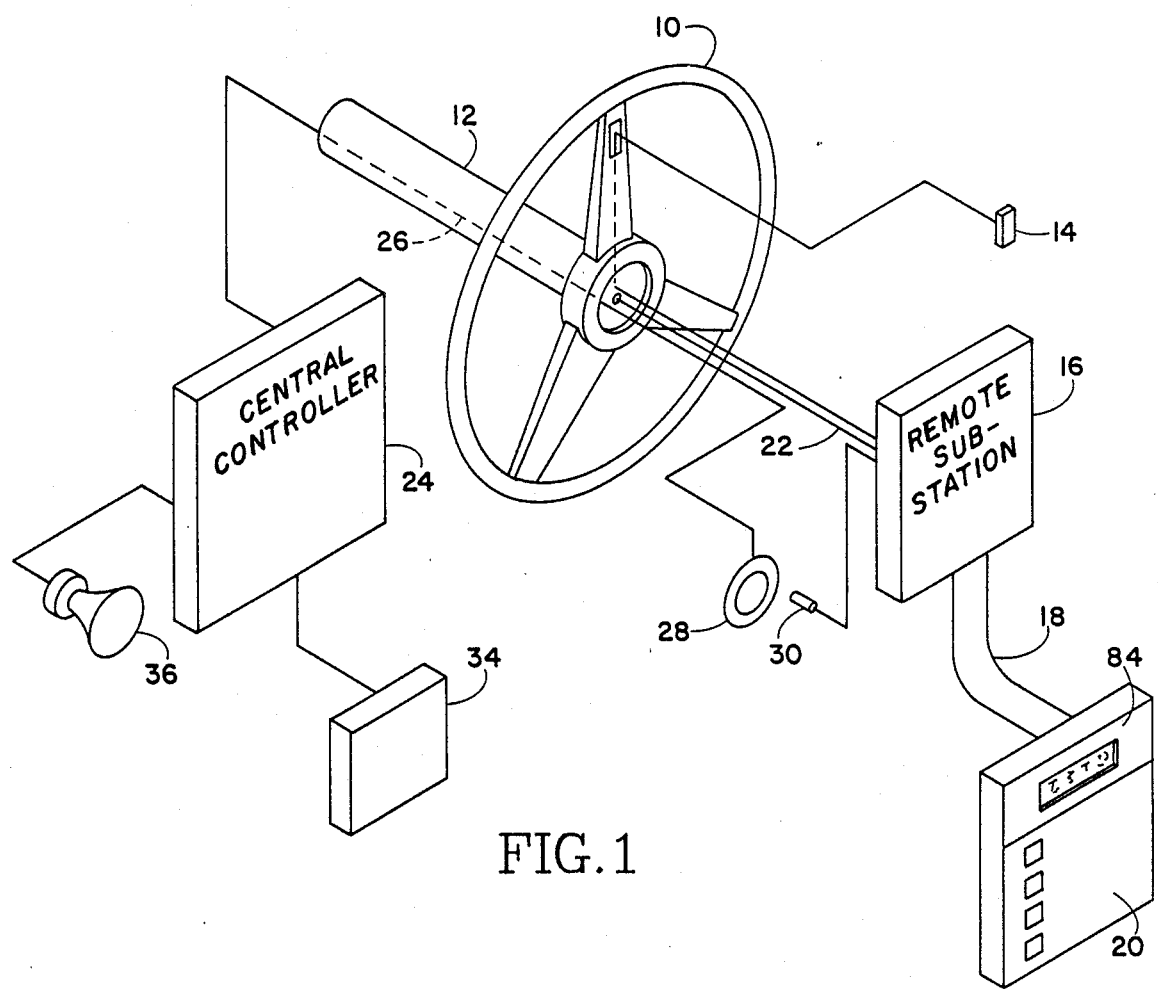
FIG. 1 is an exploded perspective view of the system of the invention adapted for use in the steering column of a vehicle.

Referring to FIG. 1, an automobile (not shown) includes a steering wheel 10 connected to a steering column 12. The steering column 12 includes a horn switch 14 which communicates with a remote substation 16. Connected to the remote substation 16 by way of a wiring harness 18 is a data entry device 20. The data entry device 20 could have many functions, some examples of which are controls for an AM/FM cassette receiver, CD player, and/or cellular radio telephone. The remote substation 16 has a ground wire 22 connected to the metal casing of the steering column 12. Data and power are supplied from a central controller 24 to the remote substation 16 over a single conductor 26 which may, for example, be the conductor that is ordinarily used as the horn wire. As is commonly the case, the horn wire 26 is connected to a slip ring 28 which makes contact with a rotary button 30 connected by wire to the remote substation 16. The central controller 24 is a microprocessor-based computer and receiver/transmitter which may control the various accessory devices described above and designated generally herein as 34. The central controller is also connected to the automobile horn 36. The ground path for the electrical circuit is the steering column 12.

The remote substation 16 is unpowered except from a power supply controlled by the central controller 24 and, as such, the conductor 26 and the ground path provided by the steering column are the only means for supplying power to the remote substation 16. In addition, the conductor 26 provides a two-way communication path between the remote substation 16 and the central controller 12 and may also provide the conductive link from the horn switch 14 to the horn 36.

Figure 2:
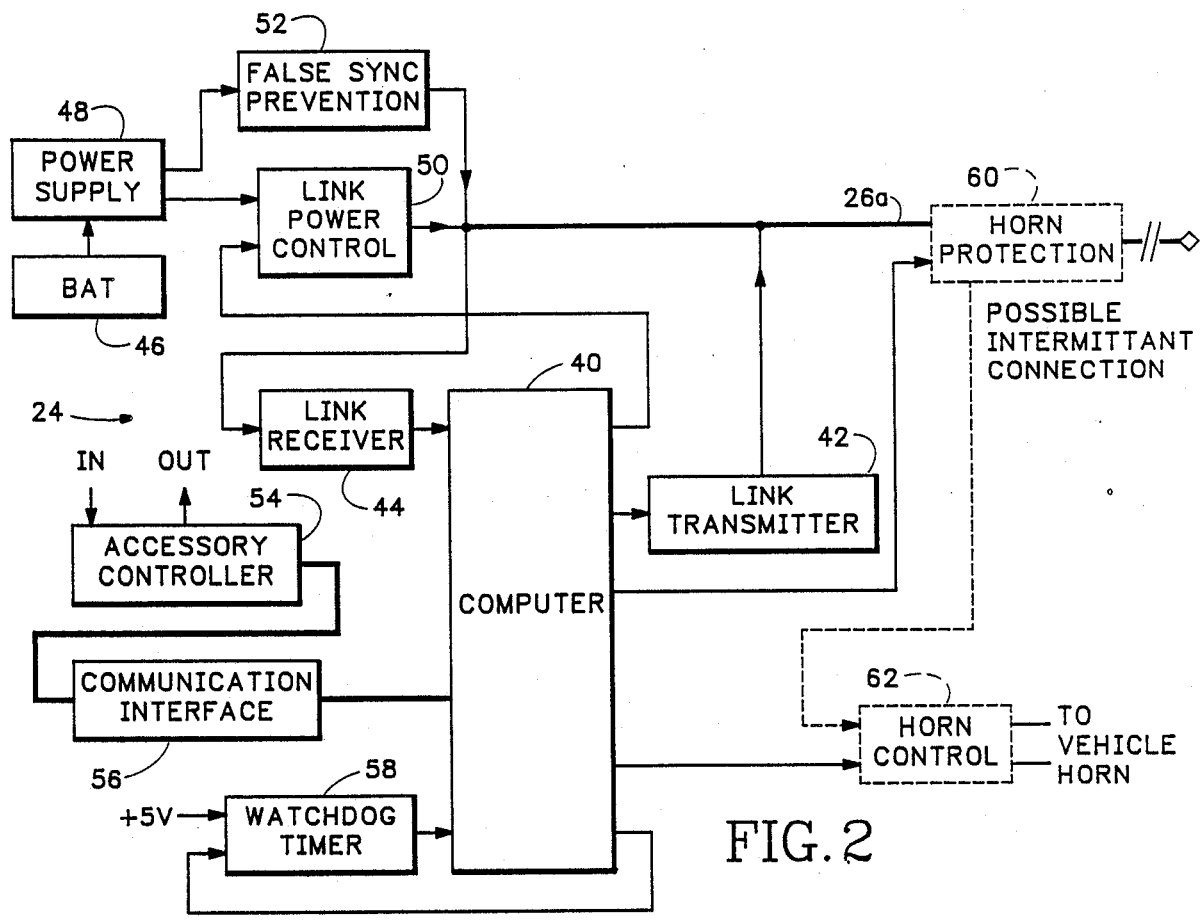
FIG. 2 is a block schematic diagram of the central controller shown in FIG. 1.

Referring now to FIG. 2 the central controller 24 includes a computer 40 which comprises a microprocessor and associated memory (not separately shown). The computer 40 is connected to a link transmitter 42 which has an output coupled to the bottom portion (bottom link) 26a of conductive link 26. A link receiver 44 is also coupled between the bottom link 26a and the computer 40. A battery 46 which may be the automobile battery, provides a DC voltage for a power supply 48. The power supply 48 is, in turn, connected to a link power control circuit 50 which couples the power supply to the bottom link 26a under control of the computer 40. A false sync prevention circuit 52 is connected between the power supply 48 and the bottom link 26a, the purpose of which will be described in more detail below. The accessories are controlled by an accessory controller circuit 54 which is coupled by way of a communication interface 56 to the computer 40. The computer 40 also includes a watchdog timer circuit 58 which automatically resets the computer 40 in the event of a communications failure. If the invention is to be used in the environment of an automobile with the horn wire as the conductive link 26, a horn protection circuit 60 is provided as shown in dashed outline in FIG. 2. This is connected to a horn control circuit 62 which is also connected to computer 40.

Figure 3:
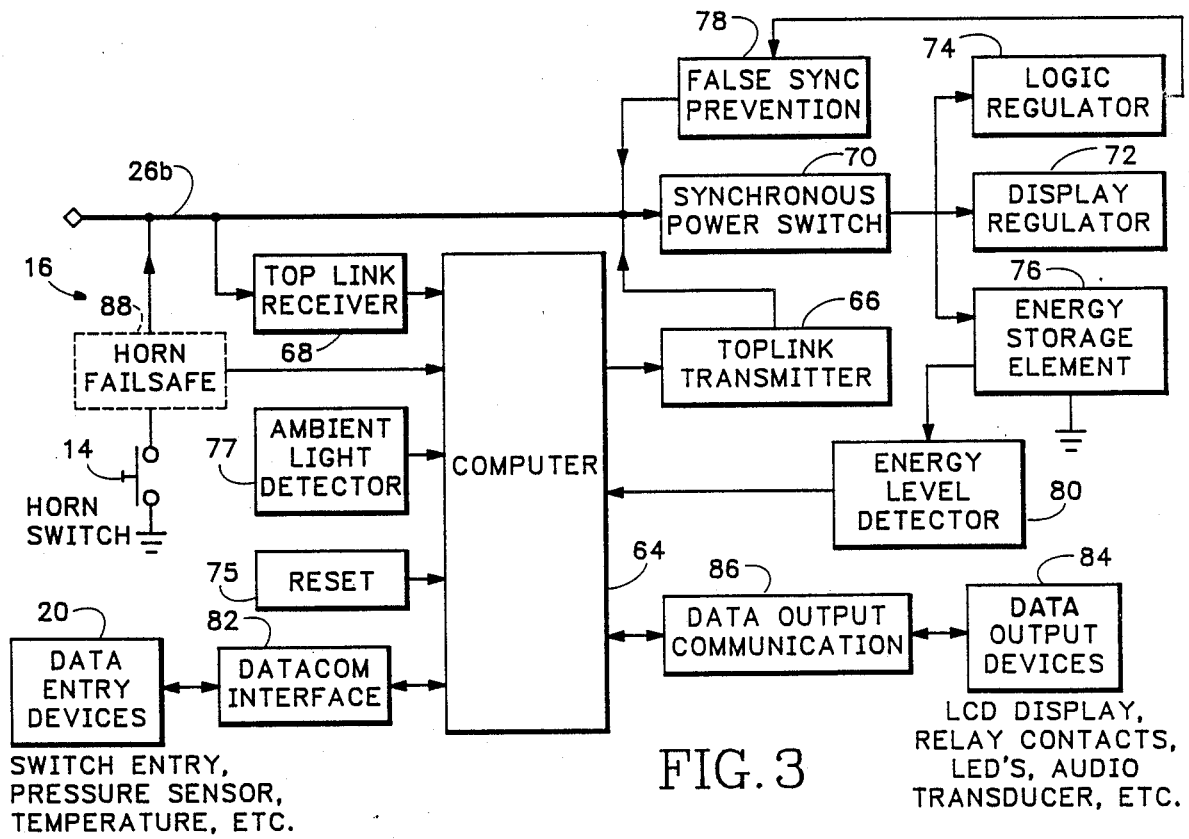
FIG. 3 is a block schematic diagram of the remote substation and data entry device shown in FIG. 1.

The remote substation 16 is shown generally in FIG. 3. Like the central controller 24, the remote substation 16 includes a computer 64 which is connected to the conductive link by way of a transmitter 66 and a receiver 68. A synchronous power switch 70 at the end of the top portion (top link) 26b of the conductive link 26 controls a display regulator 72, a logic regulator 74 and provides power to an energy storage element 76. The logic regulator 74 is coupled to a false sync prevention circuit 78 which is in turn coupled to the top link 26b. In order to monitor the amount of energy present in the energy storage element 76, an energy level detection circuit 80 is provided which includes an output connected to the computer 64. Various devices such as the data entry device 20 may be connected to the computer 64 by way of a data communications interface 82. There may also be data output devices 84 which may include, for example, an LCD display, LEDs or an audio transducer which are connected to the computer 64 by way of a data output communication interface 86. The nature of the data entry devices 20, the data output devices 84, and also the interfaces connecting each of these respective devices to the computer 64 are determined by the application desired. Conventional or special purpose interfacing and choice of the particular types of the devices will be, for the most part, determined by the particular environment in which the invention is to be used. The details of such devices are well known in the art and no further explanation of their construction and mode of operation is necessary.

If the invention is used in the environment of an automobile as mentioned above, a horn switch 14 is provided which is connected to a horn fail safe circuit 88. The horn fail safe circuit 88 is, in turn, connected to the computer 64 and to the top link 26b. This circuit will connect the horn switch directly to the conductive link 26 in the event of a communication failure between the computers 40 and 64 or in the event of a power supply failure.

Data is transmitted over the conductive link 26 by interrupting the power provided by the link power control 50 for a short interval and inserting a data packet from the computer 40 through the link transmitter 42. This first data packet is then followed by a data packet generated by the computer 64 at the other end of the link 26. Power is then reapplied by the link power control 50 under the control of computer 40 and the process repeats indefinitely. The data packets which are transmitted and received are collected into message packets which are transmitted serially with each data byte being formed into a data packet for transmission between the two controllers. These message packets are transmitted continuously even when the message packet contains no data, in which case a null message is sent. In this manner the central controller continuously monitors the integrity of the link 26. This is to ensure that the link 26 will always be ready to send data when it is necessary, and also ensures that horn messages may be capable of being sent if necessary, as well as transforming clocking information to the remote substation, since the rate of data packet transmission equals the clock rate.

The power supply 48 is supplied with voltage from battery 46 and conditions this power to remove electrical noise and also provides fuse protection. The power supply circuit 48 provides filtered and fused battery voltage to the link power control 50 and regulated 5 volts to other circuitry. When power is first applied, the watchdog timer 58 applies a reset command for a short time to the computer 40 to force it to a known state. When the reset function is completed, the computer 40 pulses the watchdog timer 58 several times to be sure it will not reset the computer 40 again, and then proceeds to go to its initial operating state. When the computer 40 has finished checking its memory, setting the state of its output ports, and other housekeeping tasks, it turns on the link power control circuit 50 and then applies current limited power to the link 26a.

Next the computer 40 pulses the horn protection circuit 60 to enable the power applied to the link 26a to pass through the horn protection circuit 60 and on up the link 26 to the remote substation 16. The computer 40 then waits a short interval to allow time for the computer 64 in the remote substation 16 to stabilize due to the sudden application of power, and to allow time for the horn fail safe circuit 88 to remove the failsafe horn information from the link 26. Next, the computer 40 attempts to establish communication with the computer 64. If communication cannot be established within a prescribed interval, the computer 40 will deactivate the horn protection circuit 60 permitting the failsafe horn information to again control the horn operation, and if instructed, will also notify the accessory controller 54 of link failure. The process of alternately attempting to establish communication and then restoring the horn to its normal operation will continue indefinitely until communication is established. In addition, if communication is interrupted for a predetermined interval after being established, the process will again be invoked. In this way normal functioning of the horn is always guaranteed in the event of failure of communication between computer 40 and computer 64.

Figure 5:
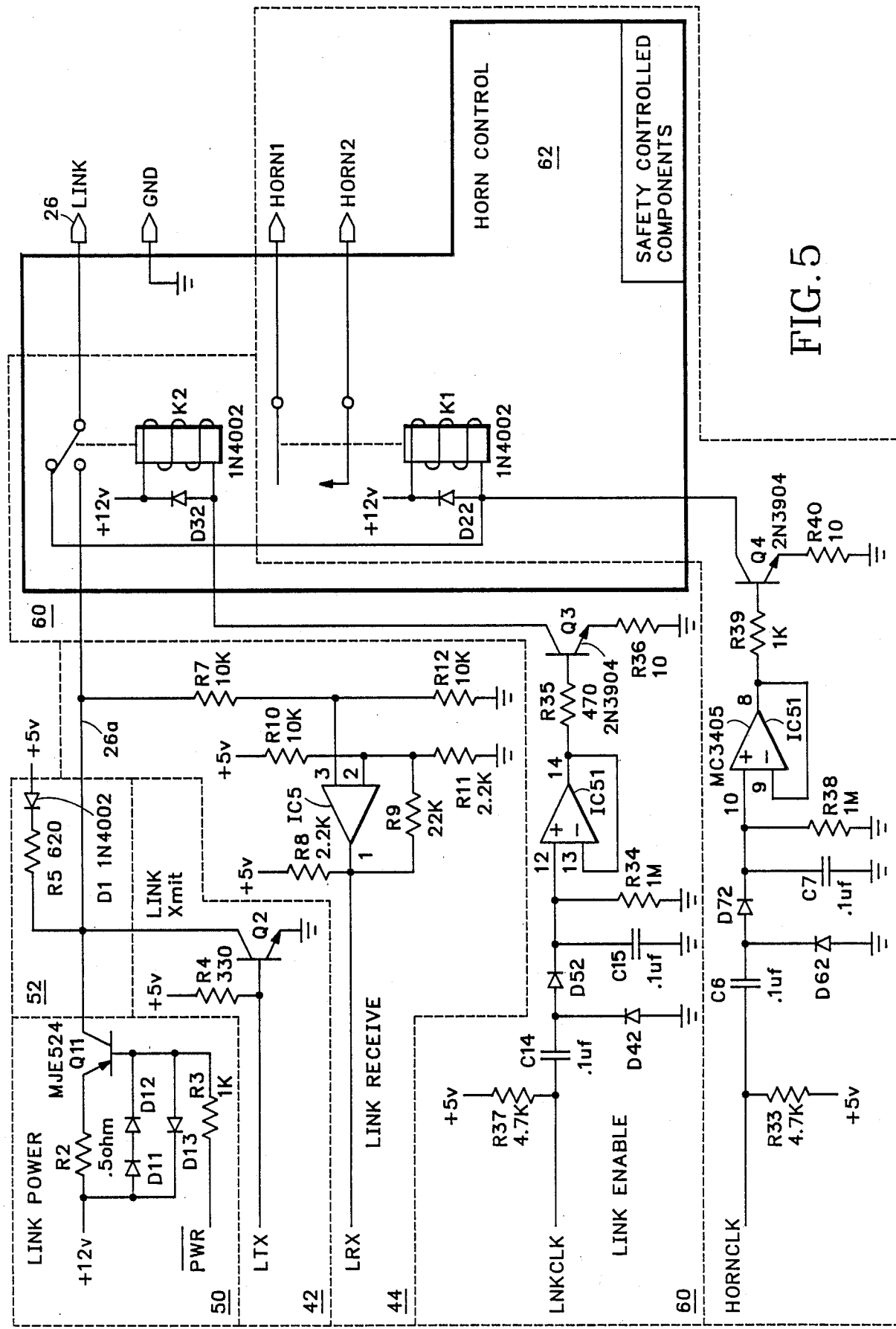
FIG. 5 is a detailed schematic diagram of a portion of the circuitry shown in the block schematic diagram of FIG. 2.

FIG. 5 shows in detail portions of the central controller 24 shown in FIG. 2. Link power control 50 receives a 12 volt DC supply from power supply 48 as powered by battery 46. This circuit is under the control of the $\overline{PWR}$ output of computer 40. $\overline{PWR}$ goes low whenever it is desired to apply power to the conductive link 26. This power is needed to supply the voltage necessary to run all of the components associated with remote substation 16 and, as will be explained below, the transmission of power is time-shared over the conductive link 26 with the transmission and reception of data. The link power control circuit 50 is a current limited source which supplies approximately 0.5 amps to the conductive link. When $\overline{PWR}$ goes low current flows through forward-biased diodes D11 and D12. The voltage drop across this diode pair is sensed across the base-emitter junction of Q11 and resistor R2 causing Q11 to conduct until the voltage drop across its base emitter junction and the voltage across R2 are equal to the voltage applied by D11 and D12. Due to the beta factor of Q11, the current in the base circuit and in D11 and D12 is much less than the current in the emitter of Q11. This causes the voltage drop across D11 and D12 to be significantly different than the drop across the base-emitter junction of Q11 due to heating. When $\overline{PWR}$ goes high, no current is able to flow through the base circuit of Q11 thus turning it off. D13 is used to dissipate the excess base charge of Q11 to decrease the turn off time of Q11. R3 is used to dissipate the excess power when base current flows in Q11 so that the power is not absorbed by the drivers (not shown) buffering the output of the computer 40.

The false sync prevention circuit 52 includes diode D1 and Resistor R5. When power is applied to the bottom link 26a, the voltage on the link is approximately 12 volts. This voltage back-biases D1 shutting off current flow from the 5 volt supply. When power is removed, the voltage on the conductive link drops toward zero. At approximately 4.3 volts, diode D1 begins to conduct current through R5 to the conductive link to keep it from going lower, thus providing a pull-up for the link transmitter 42 and preventing the link receiver 44 from interpreting the loss of power as a data signal.

The link transmitter 42 is controlled by signals from the computer labeled LTX which are placed on the link 26 through Q2. Resistor R4 provides base current to turn on Q2 which then provides a logic low signal to the conductive link 26 when it is desired to send logic zero data up the link. When LTX goes low under the control of the computer 40, the current through R4 is routed away from the base of Q2 thus turning it off. The computer 40 assures that $\overline{PWR}$ and LTX are never active at the same time, i.e., power and information are not supplied to the link 26 simultaneously.

Link receiver 44 comprises a comparator IC5 and associated resistors R7, R8, R9, R10, R11 and R12. Pin 1 of IC5 is an open collector and R8 acts as a pullup resistor to 5 volts. R10 and R11 form a voltage divider which together with hysteresis supplied by R9 set up the switching levels at which data present on the link 26 will be detected. The voltage differential between the two levels represents the noise margin for receiving data from the link. Resistors R7 and R12 provide the comparator with one-half the voltage present on the conductive link 26. As the voltage levels on the link are varied due to communication, a conditioned version of the signals are provided to the computer as LRX. In addition to assuring that the received signal must transition between defined levels, the link receiver 44 also isolates the computer 40 from the voltages present on the link 26 during power pulses.

The horn protection circuitry 60 and the horn control circuitry 62 are provided for applications of the invention in which a safety feature such as a horn or other signalling device must have access to the conductive link in the event of failure of either computer 40 or computer 64 which would otherwise control communication of this information along the link. The horn protection circuit 60 includes a relay K2 which is shown in FIG. 5 as being in an open position as would be the case if a fail safe mode of operation were needed. Ordinarily K2 is maintained in a closed position thus providing a path from the output of the link transmitter 42 and the link receiver 44 over the link 26. K2 is maintained in a normally closed position by pulses labeled LNKCLK which are pulses generated by the computer 40. Q3 provides the current path to turn on K2 and R36 stabilizes the action of Q3 with temperature. IC51 (pins 12, 13 and 14) is configured as a unity gain buffer. At initial turn on, C15 is discharged through R34 and the output of IC51 is 0 volts, thus turning off Q3 and K2. When the computer pulses LNKCLK, the pulse is sent through C14 to rectifiers D52 and D42. The positive edge of the pulse is sent through D52 to charge C15 and D42 then conducts on the negative edge. The positive pulse causes C15 to charge up, thus raising the output at pin 14 of IC51 to positive, turning on Q3, and pulling in K2. This connects the conductive link to the transmitter 42 and receiver 44 as well as to the link power control 50 and false sync prevention circuit 52 and removes the fail safe horn path to relay K1 in horn control circuit 62. As soon as C15 has charged and the positive pulse is removed R34 begins discharging C15; but as long as C15 is charged again before the voltage reaches a level that causes Q3 to turn off, the relay K2 will remain active. Should LNKCLK fail to pulse for a period of time, however, C15 will discharge and relay K2 will open, reconnecting the link to K1 for fail safe horn operation.

The horn control circuit 62 works similarly to the horn protection circuit 60. The output of relay K1 is connected to the horn 36 under normal operation with K2 closed. The horn is operated by a computer output labeled HORNCLK. When the horn switch 14 is closed, a signal message is sent by the remote substation 16 down the link 26 to the central controller 24 which in turn provides the HORNCLK pulses. The positive edge of each pulse is used to charge C7. The voltage on C7 is buffered by IC51 (pins 8, 9 and 10) and then used to turn on Q4 which activates the horn relay K1. Should HORNCLK fail to be pulsed, K1 opens turning off the horn. This prevents the horn from being inadvertently activated should either computer fail. During fail safe, relay K2 is open as described above, thus connecting relay K1 directly with the link 26 where it can be activated by closure of the horn switch 14. As long as the computer is in its normal operational mode, however, LNKCLK will periodically pulse, keeping K2 closed, and the horn will be operated only by the HORNCLK pulses from the computer 40.

Referring again to FIG. 3, when power is applied to the link 26, it appears at the input of the syncronous power switch 70 which it passes through when the amplitude exceeds approximately 8 volts. This charges energy storage element 76 which includes a relatively large storage capacitor. The capacitor in energy storage element 76 charges to approximately 12 volts and provides energy to the logic regulator 74 which then supplies +5 volts needed to power the remote substation components (connections to all such components are not shown). These components may include, for example, the data output devices 84 and the data entry devices 20. The logic regulator 74 supplies power to the reset circuit 75 and the false sync prevention circuit 78. The reset circuit issues a reset command to the computer 64 to force it to a known initial state.

At the completion of the reset command the computer 64 begins executing its stored program and sets the state of all its output lines. It then waits for a short time to allow circuits to stabilize and is then ready to receive a signal from the top link receiver 68 in the form of a start bit that would signal the beginning of a command or data. When power is removed from the link 26, synchronous power switch 70 becomes back-biased due to energy stored in the energy storage element 76 and turns off. At the same time, the false sync prevention circuit 78 supplies approximately 4 volts to the link 26 and prevents it from reaching zero voltage potential which would cause the top link receiver 68 to indicate a start bit. The power must be restored fairly quickly so that the energy storage element 76 does not become depleted. When the power is off, the central controller 24 forces the signal on the link 26 to 0 or a voltage near 0. A pulse approaching 0 volts causes the top link receiver 68 to indicate to the computer 64 that a start bit and clock edge have been received. The computer 64 then receives data from the receiver circuit 68. When a byte has been received, the computer 64 stores it in its internal memory, and after a short wait for a final stop bit, sends its own start bit to the top link transmitter 66 which then pulls the signal on link 26 to 0. After transmitting one byte of information, the computer 64 issues continuous stop bits to release control of the conductive link 26 to the central controller. The computer 64 then determines whether the received byte was the last byte of data in a complete message packet. Data bytes previously received from the computer 40 are then interpreted as a message packet, and the data extracted is sent to the data output devices 84 via the data output communication circuit 86 where the data is displayed to the operator or some other function is performed. The computer 64 then scans the data entry devices 20 through interface 82 for any new incoming data. New data is stored internally in the memory of the computer 64 and saved for processing later. Computer 64 then examines the state of the ambient light detector 77 and determines whether to adjust the level of the lighting for the display circuits of data output devices 84. Finally, the computer 64 examines its memory to see if any remaining message needs to be transmitted, and if not, examines the state of horn switch 14 and combines the present state of horn switch 14 with the data saved earlier from the data entry devices 20 to form a new message. Next, the computer 64 waits for a new start bit from the top link receiver 68 at which point the whole sequence starts over again.

Figure 4:
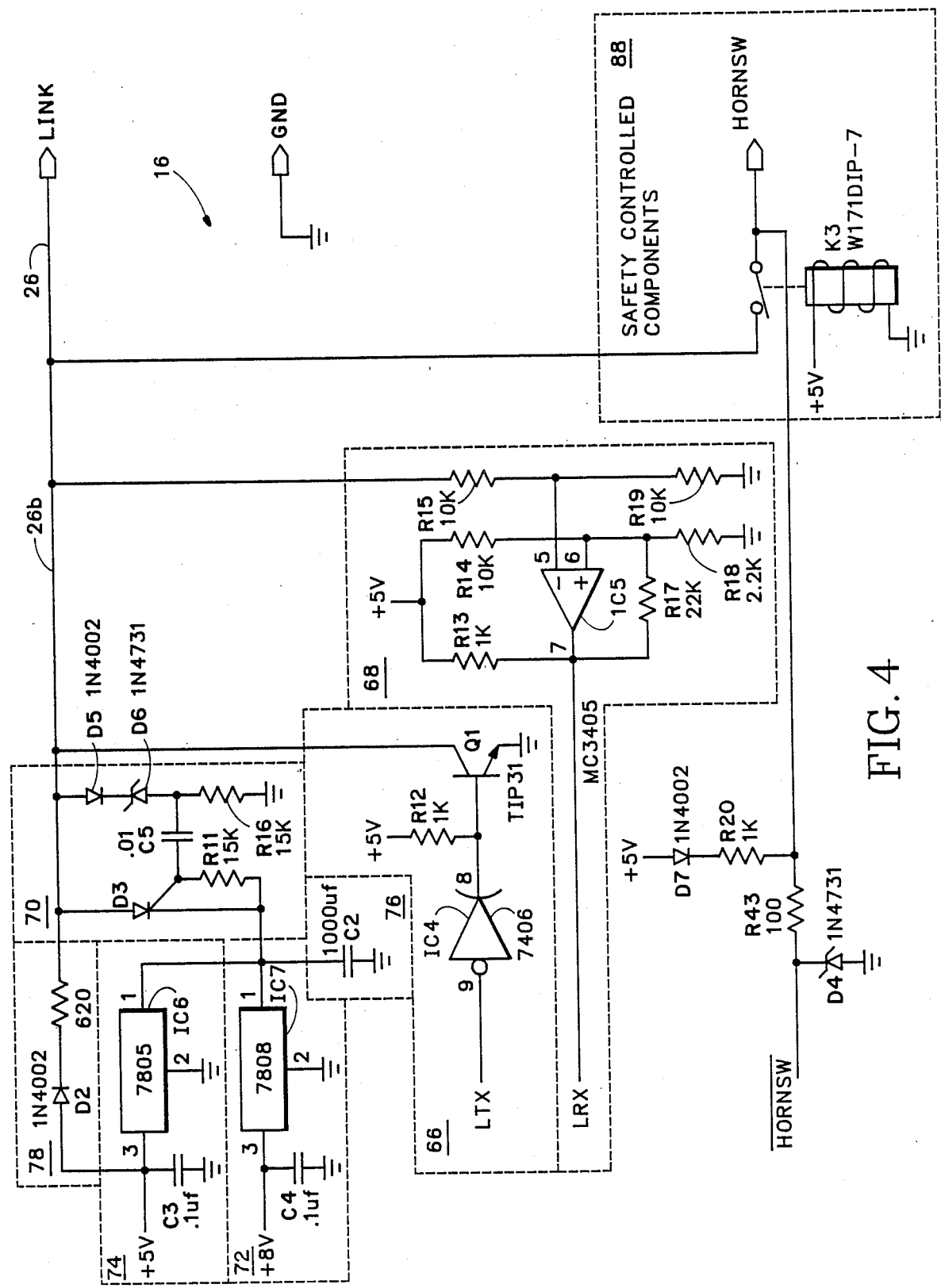
FIG. 4 is a detailed schematic diagram of a portion of the circuitry shown in the block schematic diagram of FIG. 3.

Referring now to FIG. 4 the top link 26b is coupled to a horn fail safe circuit 88 which includes a relay K3. The other contact of relay K3 is connected to a pull-up network consisting of diode D7 and resistor R20. The zener diode D4 and resistor R43 ensures that whenever power pulses are present on the link these will not damage the computer 64 to which the line carrying the $\overline{HORNSW}$ signal is connected. $\overline{HORNSW}$ is the signal that results from pushing the horn switch 14 which is shown schematically as the input to K3. Normally K3 is closed, but if there is a loss of power, it will open, connecting the switch 14 to top link 26b.

The synchronous power switch 70 comprises SCR D3, capacitor C5, resistor R11, resistor R16 and diodes D5 and D6. When power pulses of approximately 12 volts are present on the top link 26b, diodes D5 and D6 conduct, turning on SCR D3 through C5 and R11. The power pulses are routed through the SCR to the energy storage element 76 and to logic regulator 74 which comprises voltage regulator IC6 and the display regulator 72 comprising voltage regulator IC7. The logic regulator 74 provides a 5-volt supply filtered by capacitor C3 for operating the computer 64 and its associated components, and the display regulator provides an 8-volt signal filtered by C4 for operating the data output devices 84. Levels of voltage on the top link 26b that are under 8 volts are not sufficient to conduct through the combination of D5 and D6, and SCR D3 remains off. Data pulses are on the order of 5 volts and do not pass through the SCR. In devices where the horn protection circuitry are not needed SCR D3 may be replaced by a simple diode and D5, D6, R16, R11 and C5 are omitted. In this environment all energy exceeding the voltage on the energy storage element 76 is supplied to the energy storage element 76. The top link 26b also includes a false sync prevention circuit 78 which is similar to that shown in FIG. 5 and consists of diode D2 coupled to the top link 26b through resistor R10. An energy storage element 76 comprises a large storage compacitor C2 which stores a charge provided by the power pulses gated through by SCR D3.

The link transmitter 66 comprises an open collector type of inverter IC4 coupled to the base of transistor Q1 which operates in substantially the same way as the link transmitter 42 of FIG. 5. Similarly, link receiver 68 comprises a comparator IC5 which operates in substantially the same manner as link receiver 44 in FIG. 5.

Figure 7:
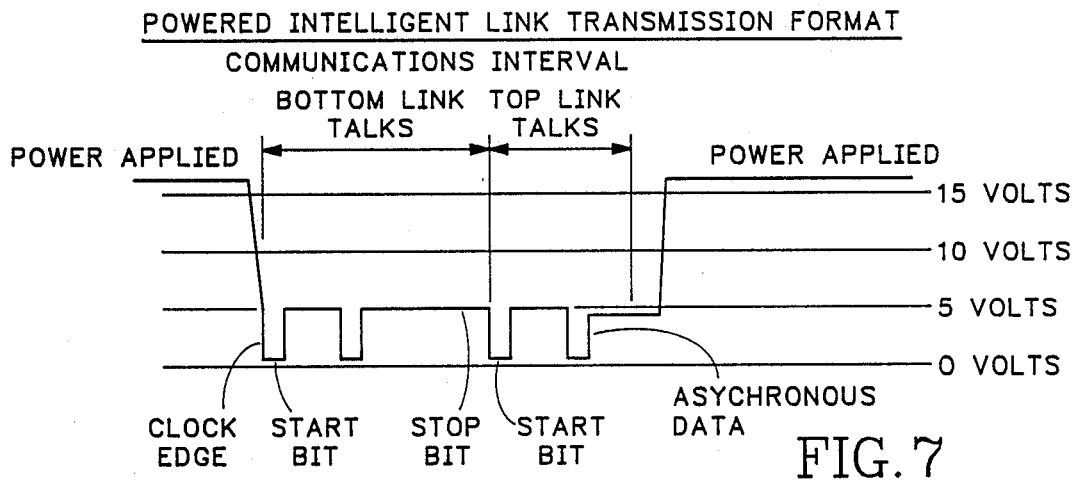
FIG. 7 is a waveform diagram illustrating how power and data are multiplexed over the communications link connecting the remote substation and the central controller.

Communication between the central controller 24 and the remote substation 16 is established as shown in FIG. 7. Shortly after issuing the start bit, the computer 40 transmits a data packet serially to the link transmitter 42 and then returns the line to idle. After transmitting a data packet, the computer 40 waits for a predetermined time to receive a data packet from computer 64. Upon receiving the responding data packet, or if the alotted time has expired, the computer 40 turns on the link power control circuit 50 again in order to restore power to the remote substation 16. This cycle is repeated at preset intervals as determined by the central controller 24 and continues as long as normal operation is maintained. As data packets are received from the computer 64 they are examined for an indication that the message is a valid message. This could be implemented by requiring that a logic 1 bit be placed in the most significant bit position which would then signify the beginning of a message packet. The particular format used for transmitting messages and for determining their validity is not critical to the invention and those skilled in the art might well chose to use other formats and protocols depending upon the particular application.

As each message packet is received from the remote substation 16, it is processed to determine whether a valid message is received, and if valid, the data is saved in internal memory. The message is then examined for horn switch information and if the horn switch is indicated as active, the horn control circuit 62 is pulsed by the HORNCLK signal to activate the transducer 36.

Figure 8:
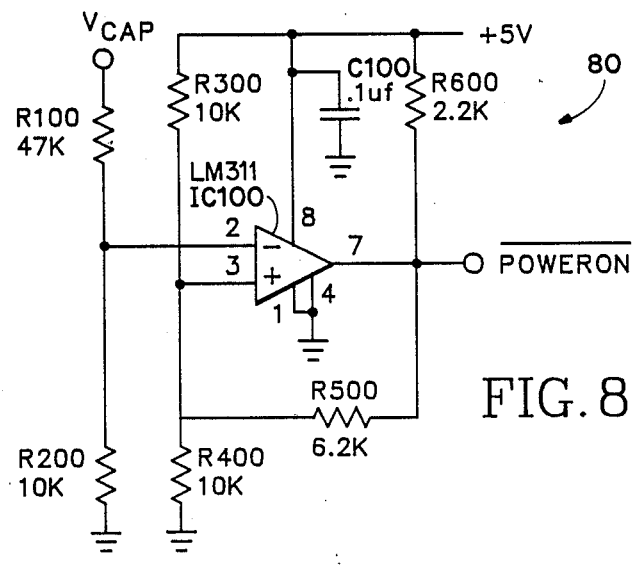
FIG. 8 is a schematic diagram of the energy level detection circuit of FIG. 3.

In some instances, it may be desirable to monitor the power level in the energy storage element 76 by the use of energy level detection circuit 80. In these cases, one bit of information in a byte of data may indicate that the next transmission should be power rather than another data byte. Alternatively, the length of time that the link power control circuit 50 provides power over the link 26 could be lengthened. In either event, the average amount of energy per unit time will be increased to meet the needs of the energy storage element 76. A form of the energy level detection circuit 80 is shown in FIG. 8. The voltage on capacitor C2 of FIG. 4 comprises an input to a comparator amplifier IC100. The other input is a reference voltage level. The output at pin 7 of IC100 is normally low (POWERON). When this line goes high, it indicates that the voltage on capacitor C2 has dropped below an acceptable level and needs to be boosted. The computer 40 may then alter the length of the signal that it provides to link power control 50 to hold it on longer between the transmission of message packets. This will continue until voltage is restored to capacitor C2, at which time POWERON goes low and the computer 40 returns the signal $\overline{PWR}$ to its normal state.

Loss of communication between the central controller 24 and the remote substation 16 is a potential problem, and it is therefore necessary to provide a reset function to restart communication in the event of a temporary failure, and to ensure that the safety feature is connected to the conductive link 26 so that it can be available even in the event of a communications failure.

Figure 6:
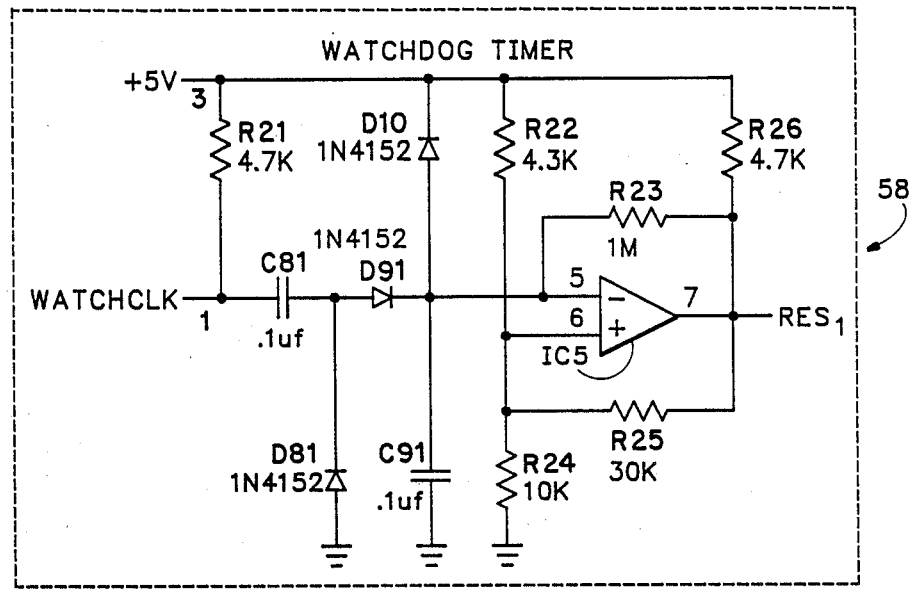
FIG. 6 is a schematic diagram of a watchdog timer circuit as shown in the block diagram of FIG. 2.

A watchdog timer 58 is shown in FIG. 6 which provides a reset pulse to computer 40 in the event that timing elements in the watchdog timer circuit 58 time out before being pulsed by the WATCHCLK pulse from computer 40 within a preset period of time. This timer operates in essentially the same manner as the timers described above in connection with FIG. 5 as the horn protection circuit 60 and the horn control 62. The computer 40 periodically provides a pulse which keeps capacitor C91 charged. In the absence of a WATCHCLK pulse C91 is allowed to discharge. If it discharges for too long, comparator IC5 goes high sending a reset pulse to the reset input of computer 40.

The computers 40 and 64 operate according to computer programs entitled "bottom link" and "top link," respectively, which are reproduced in an appendix immediately preceeding the claims.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

APPENDIX

```
1          *Program Name: BOTTOMLINK-V102688Z (Source Code)
2          *    Copyright 1988, by John R. Zeigler
3          *    All rights reserved
4          *
5          *SOURCE = FILE #7
6          *MACHINE= FILE #11
7          *
8          *This program is designed to transmit and receive data from/to
9          *the keyboard/display up the steering column to the top
10         *link end. The data format consists of 4 byte messages which
11         *contain error checking information, the data to be transmitted,
12         *a message number, and horn information. Data is transmitted up
13         *and down the link in a time shared fashion along with power at
14         *a rate of 500 bytes per second and error free message content
15         *is transferred to the display at 500 bits per second. All data
16         *is buffered up to 20 bytes deep. In addition, the data rate
17         *controls the clock supplied to the keyboard/display and the
18         *rate at which horn information is transferred. Continuous checks
19         *are made of the link integrity and should the link fail the
20         *operator is notified. Link checking is provided by incrementing
21         *a counter whenever a faulty transmission is received and
22         * decrementing the counter when a valid transmission is received.
23         *The error counter is prohibited from decrementing below zero,
24         *but will cause the user to be notified if it exceeds 127.
25
26         *STARTUP CONSTANTS************************************
27
28  F400   PROGRAM    EQU $F400    *0800
29  0040   VARIABLES  EQU $0040    *0000
30  0FFA   VECTORS    EQU $0FFA
31
32         *I/O CONSTANTS*************************************
33
34  12     IER        EQU $12      *8F
35  00     PORTA      EQU $00      *80
36  01     PORTB      EQU $01      *81
37  02     PORTC      EQU $02      *82
38  03     PORTD      EQU $03      *83
39  1A     TIMERLHIT  EQU $1A      *88
40  18     TIMERLLOW  EQU $18      *85
41  1000   DUMMY      EQU $1000
42
43         *MASK CONSTANTS************************************
44
45  10     CLKMSK     EQU $10      MASK FOR ISOLATING CLOCK BIT
```

```
46    DF                          HORNMASK    EQU $DF        MASK FOR ISOLATING HORN BIT
47
48
49                                *VARIABLES****************************************************
50
51    0040                                    ORG VARIABLES
52
53    0040              DIMCNT      RMB 1          60 msec counter
54    0041              DIMSWCNT    RMB 1          10 msec counter
55    0042              DIMSWFLG    RMB 1          Dim switch past status flag
56    0043              ERRCNT      RMB 1          Error counter for link transmission
57    0044              RRXCNT      RMB 1          Handset receive bit counter
58    0045              RRXDAT      RMB 1          Data Byte being received from radio
59    0046              RRXDATB     RMB 1          Byte with LSB=radio received data
60    0047              RRXFIFO     RMB 10         Fifo for data received from radio
61    0051              RRXFINP     RMB 1          Input pointer to radio rec fifo
62    0052              RRXFOUTP    RMB 1          Output pointer to radio rec fifo
63    0053              RTXCNT      RMB 1          Handset transmit bit counter
64    0054              RTXDAT      RMB 1          Data byte being sent to radio
65    0055              RTXDATB     RMB 1          Byte contaning bit to be sent to hands
66    0056              RTXFIFO     RMB 10         Fifo for output to radio
67    0060              RTXFINP     RMB 1          Input pointer for output radio fifo
68    0061              RTXFOUTP    RMB 1          Output pointer for output radio fifo
69    0062              LINKIN      RMB 1          Raw data byte received from link
70    0063              LINKOUT     RMB 1          Raw data byte to be sent to link
71    0064              LNKCNT      RMB 1          Bit counter for link TXRX
72    0065              MSGCNT      RMB 1          Counts message bytes received
73    0066              MSGIN       RMB 4          Received message buffer
74    006A              MSGNUM      RMB 1          Current message number received
75    006B              MSGOUT      RMB 4          Transmit message buffer
76    006F              MSGOUTNUM   RMB 1          Current message number being output
77    0070              OMSGCNT     RMB 1          Pointer to output message buffer
78    0071              PMSGNUM     RMB 1          Previous message number received
79    0072              SPORTA      RMB 1          Copy of last port A output
80    0073              TEMPDATA    RMB 1          Temp storage for MSB of link data
81    0074              HORN        RMB 1          Horn control bit
82
83                                *BOTLINK******************************************************
84
85    F400                                    ORG PROGRAM
86
87    F400   78         BOTLINK     SEI                       Turn off interrupts
88    F401   D8                     CLD                       Clear decimal mode
89    F402   A2 3F                  LDX #$3F                  Set stack to top
90    F404   9A                     TXS
91    F405   20 01 F7               JSR PULSE                 Activate Link and Watchdog Timer
92    F408   20 01 F7               JSR PULSE
93    F40B   20 01 F7               JSR PULSE
94    F40E   20 05 F6               JSR MEMCHK                Check the Memory
95    F411   F0 07                  BEQ BOTLINK2              OK, so continue
96    F413   A9 80      BOTLINK1    LDA #$80                  Bad, so set LED and Wait
97    F415   85 00                  STA PORTA
98    F417   4C 13 F4               JMP BOTLINK1              forever!!!
99    F41A   20 01 F7   BOTLINK2    JSR PULSE                 Activate Link and Watchdog Timer
100   F41D   20 57 F6               JSR INIT                  Initialize variables
101   F420   A2 FF                  LDX #$FF                  Set up for stabilization time
102   F422   20 01 F7   BOTLINK3    JSR PULSE                 Keep activating timeout circuits
103   F425   20 14 F7               JSR DELAY                 Wait for delay time
104   F428   CA                     DEX                       One less to go
105   F429   D0 F7                  BNE BOTLINK3              Not done, so wait again
106   F42B   20 01 F7   BOTLINK4    JSR PULSE                 Activate Link and Watchdog Timer
107   F42E   20 C9 F4               JSR RRXTX                 Obtain and transmit radio data
108   F431   20 CF F5               JSR RRX                   Process radio Rx data
109   F434   20 F4 F5               JSR PLNKTX                Process link transmit data
```

| 110 | F437 | 20 77 F4 |          | JSR LINK           | Obtain and transmit link data |
|-----|------|----------|----------|--------------------|-------------------------------|
| 111 | F43A | 20 E8 F4 | BOTLINK5 | JSR PLNKRX         | Process received link data    |
| 112 | F43D | 20 99 F5 |          | JSR RTX            | Process radio tx data         |
| 113 | F440 | A5 43    |          | LDA ERRCNT         | Sufficient errors to abort?   |
| 114 | F442 | 30 0D    |          | BMI BOTLINK6       | Yes, so exit                  |
| 115 | F444 | A5 72    |          | LDA SPORTA         | Turn off the horn if on       |
| 116 | F446 | 29 DF    |          | AND #$DF           | Mask off horn bit             |
| 117 | F448 | 09 14    |          | ORA #$14           | Make sure inputs are high     |
| 118 | F44A | 85 72    |          | STA SPORTA         | Save a copy                   |
| 119 | F44C | 85 00    |          | STA PORTA          | and set horn off              |
| 120 | F44E | 4C 28 F4 |          | JMP BOTLINK4       | and do it all again           |
| 121 | F451 | A5 72    | BOTLINK6 | LDA SPORTA         | Turn off power                |
| 122 | F453 | 29 FE    |          | AND #$FE           | Mask off power control bit    |
| 123 | F455 | 09 14    |          | ORA #$14           | Make sure inputs are high     |
| 124 | F457 | 85 72    |          | STA SPORTA         | Save copy                     |
| 125 | F459 | 85 00    |          | STA PORTA          | and output                    |
| 126 | F45B | A9 0F    |          | LDA #$0F           | Set up for long delay (5 sec) |
| 127 | F45D | 85 73    |          | STA TEMPDATA       |                               |
| 128 | F45F | A9 FF    |          | LDA #$FF           |                               |
| 129 | F461 | 85 74    |          | STA HORN           | Previous variables useless    |
| 130 | F463 | 85 40    |          | STA DIMCNT         |                               |
| 131 | F465 | C6 40    | BOTLINK7 | DEC DIMCNT         | Wait                          |
| 132 | F467 | D0 FC    |          | BNE BOTLINK7       |                               |
| 133 | F469 | 20 0F F7 |          | JSR WCLKP          | Keep Watchdog Timer Active    |
| 134 | F46C | C6 74    |          | DEC HORN           |                               |
| 135 | F46E | D0 F5    |          | BNE BOTLINK7       |                               |
| 136 | F470 | C6 73    |          | DEC TEMPDATA       |                               |
| 137 | F472 | D0 F1    |          | BNE BOTLINK7       |                               |
| 138 | F474 | 4C 00 F4 |          | JMP BOTLINK        | And start over                |
| 139 |      |          |          |                    |                               |
| 140 |      |          |          | *LINK************************************************ |
| 141 |      |          |          | *                  |                               |
| 142 |      |          |          | *LINK is the subrouitine which waits for a start bit from the |
| 143 |      |          |          | *lower link end and then inputs the data and subsequently |
| 144 |      |          |          | *outputs the data. The data is transmitted LSB first at 10 usec |
| 145 |      |          |          | *per bit and preceeded by a start bit and followed by two stop |
| 146 |      |          |          | *bits.             |                               |
| 147 |      |          |          | *                  |                               |
| 148 |      |          |          | * Variablies*   Input   Output   Altered |
| 149 |      |          |          | * LNKCNT                              0  |
| 150 |      |          |          | * LINKIN        Data                     |
| 151 |      |          |          | * LINKOUT               Data             |
| 152 |      |          |          | * PORTA                          1111111X |
| 153 |      |          |          | *                  |                               |
| 154 |      |          |          | ************************************************ |
| 155 |      |          |          |                    |                               |
| 156 | F477 | A9 18    | LINK     | LDA #$18           | Set up timer low latch        |
| 157 | F479 | 85 18    |          | STA TIMERLLOW      | in preparation for interupt   |
| 158 | F47B | A5 72    |          | LDA SPORTA         | Turn off power                |
| 159 | F47D | 29 FE    |          | AND #$FE           |                               |
| 160 | F47F | 85 72    |          | STA SPORTA         |                               |
| 161 | F481 | 85 00    |          | STA PORTA          |                               |
| 162 | F483 | A9 09    |          | LDA #$09           | Set up to output 8 bits       |
| 163 | F485 | 85 64    |          | STA LNKCNT         |                               |
| 164 | F487 | A2 0A    |          | LDX #10            | Allow time for link to discharge |
| 165 | F489 | CA       | LINK1    | DEX                |                               |
| 166 | F48A | D0 FD    |          | BNE LINK1          |                               |
| 167 | F48C | 38       |          | SEC                | Preset the start bit          |
| 168 | F48D | 26 63    |          | ROL LINKOUT        | into linkout                  |
| 169 | F48F | 66 63    | LINK2    | ROR LINKOUT        | Get bit to output             |
| 170 | F491 | 2A       |          | ROL A              | and put in accumulator        |
| 171 | F492 | 09 FE    |          | ORA #$FE           | Set all upper bit to 1        |
| 172 | F494 | 85 01    |          | STA PORTB          | and output                    |
| 173 | F496 | C6 64    |          | DEC LNKCNT         | Done all bits?                |

```
174   F498  D0 F5                    BNE LINK2       No, output next bit.
175   F49A  A9 01                    LDA #$01        Yes, set interrupt for timeout
176   F49C  85 1A                    STA TIMERLHIT
177   F49E  AD 00 10                 LDA DUMMY       Waste 3 clock cycles
178   F4A1  A9 FE                    LDA #$FE        and then set in stop
179   F4A3  85 01                    STA PORTB       bits
180   F4A5  A9 10                    LDA #$10        Enable timer interrupt
181   F4A7  85 12                    STA IER
182   F4A9  58                       CLI             and then main interrupts
183   F4AA  A9 08                    LDA #$08        Set up to receive 8 bits
184   F4AC  85 64                    STA LNKCNT
185   F4AE  A5 01      .LINK3        LDA PORTB       Make sure no start bit yet
186   F4B0  30 FC                    BMI LINK3
187   F4B2  A5 01      LINK4         LDA PORTB       Wait fo leading edge
188   F4B4  10 FC                    BPL LINK4       of start bit
189   F4B6  A2 04                    LDX #4          Delay to middle of first bit
190   F4B8  CA         LINK5         DEX
191   F4B9  D0 FD                    BNE LINK5
192   F4BB  A5 01      LINK6         LDA PORTB       Get data bit
193   F4BD  0A                       ASL A           Move it to carry
194   F4BE  66 62                    ROR LINKIN      and then to receive byte
195   F4C0  C6 64                    DEC LNKCNT      Done all bits?
196   F4C2  EA                       NOP
197   F4C3  D0 F6                    BNE LINK6       No, get next bit
198   F4C5  A9 00      LINKEND       LDA #$00        Yes, wait for interrupt
199   F4C7  F0 FC                    BEQ LINKEND
200
201
202                                  *RRXTX****************************************************
203                                  *
204                                  *   RRXTX transmits and receives data bits from the radio
205                                  *
206                                  *********************************************************
207   F4C9  A5 00      RRXTX         LDA PORTA       Make sure clock is low
208   F4CB  29 10                    AND #$10
209   F4CD  D0 FA                    BNE RRXTX
210   F4CF  A5 00      RRXTX1        LDA PORTA       Wait for clock to go high
211   F4D1  29 10                    AND #$10
212   F4D3  F0 FA                    BEQ RRXTX1
213   F4D5  A5 72                    LDA SPORTA      Transmit new bit to radio
214   F4D7  29 FD                    AND #$FD
215   F4D9  05 55                    ORA RTXDATB
216   F4DB  85 00                    STA PORTA
217   F4DD  85 72                    STA SPORTA
218   F4DF  A5 00                    LDA PORTA       Get new bit from radio
219   F4E1  29 04                    AND #$04
220   F4E3  4A                       LSR A
221   F4E4  4A                       LSR A
222   F4E5  85 46                    STA RRXDATB
223   F4E7  60                       RTS
224
225                                  *PLNKRX***************************************************
226                                  *
227                                  *
228                                  *
229                                  *********************************************************
230
231   F4E8  A5 65      PLNKRX        LDA MSGCNT      Get message counter
232   F4EA  D0 14                    BNE PLNKRX2     Message in progress, yes
233   F4EC  A5 62                    LDA LINKIN      No, mask for start nibble
234   F4EE  29 F0                    AND #$F0
235   F4F0  C9 A0                    CMP #$A0        Is it start cmd?
236   F4F2  D0 0A                    BNE PLNKRX1     No, so exit
237   F4F4  A6 65                    LDX MSGCNT      Get message pointer
```

| | | | | | |
|---|---|---|---|---|---|
| 238 | F4F6 | A5 62 | | LDA LINKIN | Get link input data |
| 239 | F4F8 | 95 66 | | STA MSGIN,X | Put in message input buffer |
| 240 | F4FA | E8 | | INX | Advance message pointer counter |
| 241 | F4FB | 86 65 | | STX MSGCNT | and save it |
| 242 | F4FD | 60 | | RTS | |
| 243 | F4FE | 60 | PLNKRX1 | RTS | |
| 244 | F4FF | 60 | PLNKRX1A | RTS | |
| 245 | F500 | A5 62 | PLNKRX2 | LDA LINKIN | Get data |
| 246 | F502 | A6 65 | | LDX MSGCNT | and buffer pointer |
| 247 | F504 | 95 66 | | STA MSGIN,X | put data in buffer |
| 248 | F506 | E8 | | INX | advance message counter |
| 249 | F507 | 86 65 | | STX MSGCNT | and save it |
| 250 | F509 | E0 04 | | CPX #$04 | Is the buffer full? |
| 251 | F50B | D0 F2 | | BNE PLNKRX1A | No, so exit |
| 252 | F50D | A2 00 | | LDX #$00 | Yes, clear message counter |
| 253 | F50F | 86 65 | | STX MSGCNT | |
| 254 | F511 | A2 01 | | LDX #$01 | Form checksum |
| 255 | F513 | A5 66 | | LDA MSGIN | on first three bytes |
| 256 | F515 | 18 | PLNKRX3 | CLC | without cy |
| 257 | F516 | 75 66 | | ADC MSGIN,X | |
| 258 | F518 | E8 | | INX | |
| 259 | F519 | E0 03 | | CPX #$03 | |
| 260 | F51B | D0 F8 | | BNE PLNKRX3 | |
| 261 | F51D | 49 FF | | EOR #$FF | Invert the Sum |
| 262 | F51F | 29 7F | | AND #$7F | Mask off MSB |
| 263 | F521 | D5 66 | | CMP MSGIN,X | Same as checksum? |
| 264 | F523 | F0 16 | | BEQ PLNKRX6 | Yes, continue process |
| 265 | F525 | A6 43 | | LDX ERRCNT | No, update error |
| 266 | F527 | E0 80 | | CPX #$80 | Should we turn on errbit |
| 267 | F529 | 90 08 | | BCC PLNKRX4 | No |
| 268 | F52B | A5 72 | | LDA SPORTA | Turn on port A bit 7 |
| 269 | F52D | 09 80 | | ORA #$80 | |
| 270 | F52F | 85 72 | | STA SPORTA | |
| 271 | F531 | 85 00 | | STA PORTA | |
| 272 | F533 | E0 FF | PLNKRX4 | CPX #$FF | Max count? |
| 273 | F535 | F0 03 | | BEQ PLNKRX5 | Yes, don t add error |
| 274 | F537 | E6 43 | | INC ERRCNT | No, advance error counter |
| 275 | F539 | 60 | | RTS | and exit |
| 276 | F53A | 60 | PLNKRX5 | RTS | |
| 277 | F53B | A6 43 | PLNKRX6 | LDX ERRCNT | Time to turn off errbit? |
| 278 | F53D | E0 80 | | CPX #$80 | |
| 279 | F53F | B0 08 | | BCS PLNKRX6A | No |
| 280 | F541 | A5 72 | | LDA SPORTA | |
| 281 | F543 | 29 7F | | AND #$7F | |
| 282 | F545 | 85 72 | | STA SPORTA | |
| 283 | F547 | 85 00 | | STA PORTA | |
| 284 | F549 | E0 00 | PLNKRX6A | CPX #$00 | Minimum count? |
| 285 | F54B | F0 02 | | BEQ PLNKRX7 | Yes, don t change it |
| 286 | F54D | C6 43 | | DEC ERRCNT | Error count = 1 less |
| 287 | F54F | A5 6A | PLNKRX7 | LDA MSGNUM | Update message number |
| 288 | F551 | 85 71 | | STA PMSGNUM | |
| 289 | F553 | A5 66 | | LDA MSGIN | |
| 290 | F555 | 29 0F | | AND #$0F | |
| 291 | F557 | 85 6A | | STA MSGNUM | |
| 292 | F559 | A5 67 | | LDA MSGIN+1 | Get ack message number |
| 293 | F55B | 29 0F | | AND #$0F | |
| 294 | F55D | C5 6F | | CMP MSGOUTNUM | Same as current output message? |
| 295 | F55F | D0 06 | | BNE PLNKRX8 | No, so don t advance |
| 296 | F561 | A5 6F | | LDA MSGOUTNUM | Yes, mark ready for next message |
| 297 | F563 | 09 80 | | ORA #$80 | |
| 298 | F565 | 85 6F | | STA MSGOUTNUM | |
| 299 | F567 | A5 67 | PLNKRX8 | LDA MSGIN+1 | Get horn control bit |
| 300 | F569 | 29 10 | | AND #$10 | |

```
301  F56B  0A        ASL A           Move it to horn control position
302  F56C  85 74     STA HORN
303  F56E  A5 72     LDA SPORTA      Mask old horn contol off
304  F570  29 0F     AND #$0F
305  F572  05 74     ORA HORN        add in new horn control
306  F574  85 72     STA SPORTA      Save it
307  F576  85 00     STA PORTA       and output
308  F578  A5 6A     LDA MSGNUM      Same message as before?
309  F57A  C5 71     CMP PMSGNUM
310  F57C  F0 19     BEQ PLNKRX10    Yes, exit
311  F57E  A5 67     LDA MSGIN+1     Get data MSB
312  F580  0A        ASL A           move it to msb
313  F581  29 80     AND #$80        eliminate remainder
314  F583  05 68     ORA MSGIN+2     add message in byte 2, blank?
315  F585  C9 00     CMP #$00
316  F587  F0 0F     BEQ PLNKRX11    Yes, exit
317  F589  A6 60     LDX RTXFINP     No, put data in radio fifo
318  F58B  95 56     STA RTXFIFO,X
319  F58D  E8        INX             Advance pointer
320  F58E  E0 0A     CPX #10         Rollover?
321  F590  D0 02     BNE PLNKRX9     No, so save it
322  F592  A2 00     LDX #$00        Yes, reset to beginning
323  F594  86 60  PLNKRX9   STX RTXFINP
324  F596  60        RTS
325  F597  60  PLNKRX10  RTS         exit, same message as before
326  F598  60  PLNKRX11  RTS         exit, blank data
327
328              *RTX***********************************************************
329              *  Sets up bits to be transmitted to radio
330              **
331              *
332              ****************************************************************
333
334  F599  A5 53  RTX       LDA RTXCNT    Get radio transmit counter
335  F59B  F0 11            BEQ RTX2      If zero, no TX in progress
336  F59D  C9 03            CMP #$3       Ready for stop bit?
337  F59F  90 06            BCC RTXSTOP   Yes, issue stop bits
338  F5A1  46 54            LSR RTXDAT    No, put next bit into cy
339  F5A3  A9 02            LDA #$02      Preset for bit =1
340  F5A5  B0 02            BCS RTX1      OK
341  F5A7  A9 00  RTXSTOP   LDA #$00      Change to bit =0
342  F5A9  85 55  RTX1      STA RTXDATB   and save for output next clock
343  F5AB  C6 53            DEC RTXCNT    one less bit to go
344  F5AD  60               RTS
345  F5AE  A6 61  RTX2      LDX RTXFOUTP  Get pointer to fifo
346  F5B0  E4 60            CPX RTXFINP   Anyting in it?
347  F5B2  F0 16            BEQ RTXEND    No, so end
348  F5B4  B5 56            LDA RTXFIFO,X Yes, get next byte
349  F5B6  85 54            STA RTXDAT    and save in RTXDAT
350  F5B8  E8               INX           Advance pointer
351  F5B9  E0 0A            CPX #10       Rollover?
352  F5BB  D0 02            BNE RTX3      No, save it
353  F5BD  A2 00            LDX #$00      Yes, reset it to zero
354  F5BF  86 61  RTX3      STX RTXFOUTP  Save new index pointer
355  F5C1  A9 0A            LDA #$0A      Set up for 8 data and 2 stop bits
356  F5C3  85 53            STA RTXCNT
357  F5C5  A9 02            LDA #$02      Set up start bit
358  F5C7  85 55            STA RTXDATB
359  F5C9  60               RTS
360  F5CA  A9 00  RTXEND    LDA #$00      Send stop bit
361  F5CC  85 55            STA RTXDATB
362  F5CE  60               RTS
363
364              *RRX***********************************************************
```

```
365                         * Forms up bits received from radio and saves
366                         * them in fifo
367                         ***********************************************************
368
369   F5CF  A5 44    RRX     LDA RRXCNT      Is receive in progress?
370   F5D1  F0 18            BEQ RRXSTRT     No, check for start bit
371   F5D3  46 46            LSR RRXDATB     Yes, put received bit into cy
372   F5D5  66 45            ROR RRXDAT      then save it.
373   F5D7  C6 44            DEC RRXCNT      Done all bits?
374   F5D9  D0 0F            BNE RRXEND      No, so exit
375   F5DB  A5 45            LDA RRXDAT      Yes, get received data
376   F5DD  A6 51            LDX RRXFINP     Put data into fifo
377   F5DF  95 47            STA RRXFIFO,X
378   F5E1  E8               INX             Increment fifo input pointer
379   F5E2  E0 0A            CPX #10         Correct if rollover
380   F5E4  D0 02            BNE RRX1
381   F5E6  A2 00            LDX #00
382   F5E8  86 51    RRX1    STX RRXFINP
383   F5EA  60       RRXEND  RTS
384   F5EB  A5 46    RRXSTRT LDA RRXDATB     Start bit received?
385   F5ED  F0 FB            BEQ RRXEND      No, exit
386   F5EF  A9 08            LDA #$08        Yes, set counter for 8 bits
387   F5F1  85 44            STA RRXCNT
388   F5F3  60               RTS
389
390                         *PLNKTX**************************************************
391                         *
392                         *
393                         ***********************************************************
394
395   F5F4  A6 70    PLNKTX  LDX OMSGCNT     Is message in progress?
396   F5F6  E0 04            CPX #$04
397   F5F8  B0 08            BCS PLNKTX1     No, get new message
398   F5FA  B5 6B            LDA MSGOUT,X    Yes, put next byte from buffer
399   F5FC  85 63            STA LINKOUT     into LINKOUT.
400   F5FE  E8               INX             Advance the buffer pointer
401   F5FF  86 70            STX OMSGCNT
402   F601  60               RTS
403
404   F602  A5 6F    PLNKTX1 LDA MSGOUTNUM   Has message been acked?
405   F604  10 2D            BPL PLNKTX4     No, repeat it
406   F606  A6 52            LDX RRXFOUTP    Any data for output?
407   F608  E4 51            CPX RRXFINP
408   F60A  F0 1D            BEQ PLNKTX3     No, so send blank message
409   F60C  20 C7 F6         JSR RXFIFOUT    Yes, get the data from the fifo
410   F60F  85 73            STA TEMPDATA    Save MSB in tempdata
411   F611  29 7F            AND #$7F        Mask off msb since 7 bits per byte
412   F613  85 6D            STA MSGOUT+2    and save in output message buffer
413   F615  A5 6F            LDA MSGOUTNUM
414   F617  18               CLC             Yes, advance message number
415   F618  69 01            ADC #$01
416   F61A  29 0F            AND #$0F        Eliminate upper 4 bits
417   F61C  D0 02            BNE PLNKTX2     Is it zero?
418   F61E  A9 01            LDA #$01        Yes, set it to one
419   F620  85 6F    PLNKTX2 STA MSGOUTNUM   and save it
420   F622  09 A0            ORA #$A0        Set in start nibble
421   F624  85 6B            STA MSGOUT      and save in output buffer
422   F626  4C 33 F6         JMP PLNKTX4
423
424   F629  A9 A0    PLNKTX3 LDA #$A0        Set message number to zero
425   F62B  85 6B            STA MSGOUT      with start nibble
426   F62D  A9 00            LDA #$00        Set blank data
427   F62F  85 6D            STA MSGOUT+2
428   F631  85 73            STA TEMPDATA
```

```
429  F633  A5 6A        PLNKTX4   LDA MSGNUM      Get current received message number
430  F635  29 0F                  AND #$0F        Upper nible =0
431  F637  85 6C                  STA MSGOUT+1    and save it in output buffer
432  F639  A5 73                  LDA TEMPDATA    Add MSB of data to MSGOUT+1
433  F63B  4A                     LSR A
434  F63C  29 40                  AND #$40
435  F63E  05 6C                  ORA MSGOUT+1
436  F640  85 6C                  STA MSGOUT+1
437  F642  18           PLNKTX5   CLC             Form checksum without carry bit
438  F643  65 6B                  ADC MSGOUT
439  F645  18                     CLC
440  F646  65 6D                  ADC MSGOUT+2
441  F648  49 FF                  EOR #$FF        invert the checksum
442  F64A  29 7F                  AND #$7F        and zero MSB
443  F64C  85 6E                  STA MSGOUT+3    and save it in output message buffer
444  F64E  A9 01                  LDA #$01        Set output message buffer to 2nd byte
445  F650  85 70                  STA OMSGCNT
446  F652  A5 6B                  LDA MSGOUT
447  F654  85 63                  STA LINKOUT
448  F656  60                     RTS
449
450  F657  A9 FE        INIT      LDA #$FE        Set up port B
451  F659  85 01                  STA PORTB
452  F65B  A9 FF                  LDA #$FF        Set up port A
453  F65D  85 00                  STA PORTA
454  F65F  A9 FF                  LDA #$FF        Set up FF variables
455  F661  85 02                  STA PORTC
456  F663  85 03                  STA PORTD
457  F665  85 55                  STA RTXDATB
458  F667  85 46                  STA RRXDATB
459  F669  85 54                  STA RTXDAT
460  F66B  85 45                  STA RRXDAT
461  F66D  A9 00                  LDA #$00        Set up 00 variables
462  F66F  85 62                  STA LINKIN
463  F671  85 63                  STA LINKOUT
464  F673  85 65                  STA MSGCNT
465  F675  85 43                  STA ERRCNT
466  F677  85 6A                  STA MSGNUM
467  F679  85 71                  STA PMSGNUM
468  F67B  85 61                  STA RTXFOUTP
469  F67D  85 44                  STA RRXCNT
470  F67F  85 51                  STA RRXFINP
471  F681  85 52                  STA RRXFOUTP
472  F683  85 60                  STA RTXFINP
473  F685  85 53                  STA RTXCNT
474  F687  85 64                  STA LNKCNT
475  F689  A9 04                  LDA #$04        Set up output message count finished
476  F68B  85 70                  STA OMSGCNT
477  F68D  A9 80                  LDA #$80        ACK the current message out number
478  F68F  85 6F                  STA MSGOUTNUM
479  F691  A9 7F                  LDA #$7F        Now turn them both off
480  F693  85 00                  STA PORTA
481  F695  85 72                  STA SPORTA
482  F697  60                     RTS
483
484
485                   *INTR*********************************************************
486                   *
487                   *
488                   ***************************************************************
489
490  F698  68           INTR      PLA             CLEAN STACKlator
491  F699  68                     PLA
492  F69A  68                     PLA
```

| | | | | | |
|---|---|---|---|---|---|
| 493 | F69B | 68 | | PLA | |
| 494 | F69C | 68 | | PLA | |
| 495 | F69D | A5 72 | | LDA SPORTA | Turn off radio clock |
| 496 | F69F | 09 01 | | ORA #$01 | |
| 497 | F6A1 | 85 00 | | STA PORTA | |
| 498 | F6A3 | 85 72 | | STA SPORTA | |
| 499 | F6A5 | A9 00 | | LDA #$00 | Turn off timer A int. |
| 500 | F6A7 | 85 12 | | STA IER | |
| 501 | F6A9 | 4C 3A F4 | | JMP BOTLINK5 | |
| 502 | F6AC | 40 | NMI | RTI | and return |
| 503 | | | | | |
| 504 | F6AD | B5 56 | TXFIFOUT | LDA RTXFIFO,X | |
| 505 | F6AF | E8 | | INX | |
| 506 | F6B0 | E0 0A | | CPX #10 | |
| 507 | F6B2 | D0 02 | | BNE F1 | |
| 508 | F6B4 | A2 00 | | LDX #$00 | |
| 509 | F6B6 | 86 61 | F1 | STX RTXFOUTP | |
| 510 | F6B8 | 60 | | RTS | |
| 511 | F6B9 | A6 51 | RXFIFOIN | LDX RRXFINP | |
| 512 | F6BB | 95 47 | | STA RRXFIFO,X | |
| 513 | F6BD | E8 | | INX | |
| 514 | F6BE | E0 0A | | CPX #10 | |
| 515 | F6C0 | D0 02 | | BNE F2 | |
| 516 | F6C2 | A2 00 | | LDX #$00 | |
| 517 | F6C4 | 86 51 | F2 | STX RRXFINP | |
| 518 | F6C6 | 60 | | RTS | |
| 519 | | | | | |
| 520 | F6C7 | A6 52 | RXFIFOUT | LDX RRXFOUTP | Get index to radio receive fifo |
| 521 | F6C9 | B5 47 | | LDA RRXFIFO,X | Get data from fifo |
| 522 | F6CB | E8 | | INX | Advance pointer |
| 523 | F6CC | E0 0A | | CPX #10 | Overflow? |
| 524 | F6CE | D0 02 | | BNE F3 | No, so OK |
| 525 | F6D0 | A2 00 | | LDX #$00 | Yes, so reset to start of fifo |
| 526 | F6D2 | 86 52 | F3 | STX RRXFOUTP | Save output pointer |
| 527 | F6D4 | 60 | | RTS | |
| 528 | | | | | |
| 529 | F6D5 | A9 00 | MEMCHK | LDA #$00 | Preset memory with zeros |
| 530 | F6D7 | A2 3F | | LDX #$3F | 40 locations |
| 531 | F6D9 | 95 40 | MEMCHK1 | STA $40,X | Start at location 40 |
| 532 | F6DB | CA | | DEX | |
| 533 | F6DC | 10 FB | | BPL MEMCHK1 | Not past zero so again |
| 534 | F6DE | A2 3F | | LDX #$3F | Set up to check |
| 535 | F6E0 | B5 40 | MEMCHK2 | LDA $40,X | Start at location 7F |
| 536 | F6E2 | D0 1A | | BNE MERR | Not zero so error |
| 537 | F6E4 | CA | | DEX | |
| 538 | F6E5 | 10 F9 | | BPL MEMCHK2 | Index not past zero, so again |
| 539 | F6E7 | A9 FF | | LDA #$FF | Preset memory with one's |
| 540 | F6E9 | A2 3F | | LDX #$3F | 40 locations |
| 541 | F6EB | 95 40 | MEMCHK3 | STA $40,X | Start at location 7F |
| 542 | F6ED | CA | | DEX | |
| 543 | F6EE | 10 FB | | BPL MEMCHK3 | Not past zero so again |
| 544 | F6F0 | A2 3F | | LDX #$3F | Set up index again |
| 545 | F6F2 | B5 40 | MEMCHK4 | LDA $40,X | Start at location 7F |
| 546 | F6F4 | C9 FF | | CMP #$FF | Was it one's? |
| 547 | F6F6 | D0 06 | | BNE MERR | No, so exit with error |
| 548 | F6F8 | CA | | DEX | |
| 549 | F6F9 | 10 F7 | | BPL MEMCHK4 | Not past zero so again |
| 550 | F6FB | A9 00 | | LDA #$00 | |
| 551 | F6FD | 60 | | RTS | Good Memory |
| 552 | F6FE | A9 FF | MERR | LDA #$FF | |
| 553 | F700 | 60 | | RTS | BAD MEMORY |
| 554 | | | | | |
| 555 | F701 | A9 E0 | PULSE | LDA #$E0 | Turn on Watchclk and Lnkclk |

```
556   F703  85 03      PULSE1    STA PORTD
557   F705  A0 20                LDY #$20       Set up for pulse width delay
558   F707  88         PULSE2    DEY
559   F708  D0 FD                BNE PULSE2     Count it out
560   F70A  A9 80                LDA #$80       Turn off Watchclk and Lnkclk
561   F70C  85 03                STA PORTD
562   F70E  60                   RTS
563
564   F70F  A9 C0      WCLKP     LDA #$C0       Turn on Watchclk
565   F711  4C 03 F7             JMP PULSE1     and generate pulse
566
567   F714  A0 FF      .DELAY    LDY #$FF       Set up for delay
568   F716  88         DELAY1    DEY
569   F717  D0 FD                BNE DELAY1     Do it
570   F719  60                   RTS
571
572   0FFA                       ORG VECTORS
573
574   0FFA  AC F6                WORD NMI
575   0FFC  00 F4                WORD BOTLINK
576   0FFE  98 F6                WORD INTR
```

```
 1              *   Copyright 1987, by John R. Zeigler
 2              *   All rights reserved
 3              *
 4              *Program Name:  TOPLINK
 5              *
 6              *This program is designed to transmit and receive data from/to
 7              *the keyboard/display down the steering column to the bottom
 8              *link end. The data format consists of 4 byte messages which
 9              *contain error checking information, the data to be transmitted,
10              *a message number, and horn information. Data is transmitted up
11              *and down the link in a time shared fashion along with power at
12              *a rate of 500 bytes per second and error free message content
13              *is transferred to the display at 500 bits per second. All data
14              *is buffered up to 20 bytes deep. In addition, the data rate
15              *controls the closck supplied to the keyboard/display and the
16              *rate at which horn information is transferred. Continuous checks
17              *are made of the link integrity and should the link fail the
18              *operator is notified. Link checking is provided by incrementing
19              *a counter whenever a faulty transmission is received and
20              * decrementing the counter when a valid transmission is received.
21              *The error counter is prohibited from decrementing below zero,
22              *but will cause the user to be notified if it exceeds 127.
23
24              *STARTUP CONSTANTS**********************************************
25
26   F400       PROGRAM    EQU $F400    *0800
27   0040       VARIABLES  EQU $0040    *0000
28   FFFA       VECTORS    EQU $FFFA
29   20         BUFSIZE    EQU $20
30
31              *I/O CONSTANTS**************************************************
32
33   12         IER        EQU $12      *8F
34   00         PORTA      EQU $00      *80
35   01         PORTB      EQU $01      *81
36   02         PORTC      EQU $02      *82
37   03         PORTD      EQU $03      *83
38   1A         TIMERLHIT  EQU $1A      *88
39   18         TIMERLLOW  EQU $18      *85
40
41              *MASK CONSTANTS*************************************************
42
```

```
43    08                DIMBIT     EQU $08          MASK FOR SETTING HANDSET DIM BIT HIGH
44    40                DIMSW      EQU $40          MASK FOR ISOLATING DIM SWITCH
45    10                HCLKH      EQU $10          MASK FOR SETTING HANDSET CLOCK HIGH
46    FD                HCLKOFF    EQU $FD          MASK FOR ISOLATING HANDSET CLOCK
47    DF                HORNMASK   EQU $DF          MASK FOR ISOLATING HORN BIT
48
49
50                      *VARIABLES***************************************************
51
52    0040                         ORG VARIABLES
53
54    0040              DIMCNT     RMB 1            60 msec counter
55    0041              DIMSWCNT   RMB 1            10 msec counter
56    0042              DIMSWFLG   RMB 1            Dim switch past status flag
57    0043              ERRCNT     RMB 1            Error counter for link transmission
58    0044              HRXCNT     RMB 1            Handset receive bit counter
59    0045              HRXDAT     RMB 1            Data Byte being received from handset
60    0046              HRXDATB    RMB 1            Byte with LSB=handset received data
61    0047              HRXFIFO    RMB BUFSIZE      Fifo for data received from handset
62    0067              HRXFINP    RMB 1            Input pointer to handset rec fifo
63    0068              HRXFOUTP   RMB 1            Output pointer to handset rec fifo
64    0069              HTXCNT     RMB 1            Handset transmit bit counter
65    006A              HTXDAT     RMB 1            Data byte being sent to handset
66    006B              HTXDATB    RMB 1            Byte contaning bit to be sent to hands
67    006C              HTXFIFO    RMB BUFSIZE      Fifo for output to handset
68    008C              HTXFINP    RMB 1            Input pointer for output handset fifo
69    008D              HTXFOUTP   RMB 1            Output pointer for output handset fifo
70    008E              LINKIN     RMB 1            Raw data byte received from link
71    008F              LINKOUT    RMB 1            Raw data byte to be sent to link
72    0090              LNKCNT     RMB 1            Bit counter for link TXRX
73    0091              MSGCNT     RMB 1            Counts message bytes received
74    0092              MSGIN      RMB 4            Received message buffer
75    0096              MSGNUM     RMB 1            Current message number received
76    0097              MSGOUT     RMB 4            Transmit message buffer
77    0098              MSGOUTNUM  RMB 1            Current message number being output
78    009C              OMSGCNT    RMB 1            Pointer to output message buffer
79    009D              PMSGNUM    RMB 1            Previous message number received
80    009E              SPORTA     RMB 1            Copy of last port A output
81    009F              TEMPDATA   RMB 1            Temp storage for MSB of link data
82
83                      *TOPLINK*****************************************************
84
85    F400                         ORG PROGRAM
86
87    F400  43                     ASCII /COPYRIGHT 1987 BY JOHN R. ZEIGLER/
88    F421  41                     ASCII /ALL RIGHTS RESERVED/
89    F434  78          TOPLINK    SEI              Turn off interrupts
90    F435  D8                     CLD              Clear decimal mode
91    F436  A2 FF                  LDX #$FF         Set stack to top
92    F438  9A                     TXS
93    F439  20 4B F6               JSR INIT         Initialize variables
94    F43C  A9 01       TOPLINK1   LDA #$01         Set up routine numbers on port
95    F43E  85 02                  STA PORTC
96    F440  20 70 F4               JSR LINK         Obtain and transmit link data
97    F443  A9 02                  LDA #$02
98    F445  85 02                  STA PORTC
99    F447  20 B3 F4               JSR HRXTX        Obtain and transmit handset data
100   F44A  A9 04                  LDA #$04
101   F44C  85 02                  STA PORTC
102   F44E  20 DC F4               JSR PLNKRX       Process received link data
103   F451  A9 08                  LDA #$08
104   F453  85 02                  STA PORTC
105   F455  20 80 F5               JSR HTX          Process handset tx data
106   F458  A9 10                  LDA #$10
```

```
107  F45A  85 02              STA PORTC
108  F45C  20 B6 F5           JSR HRX         Process handset Rx data
109  F45F  A9 20              LDA #$20
110  F461  85 02              STA PORTC
111  F463  20 0B F5           JSR PLNKTX      Process link transmit data
112  F466  A9 40              LDA #$40
113  F468  85 02              STA PORTC
114  F46A  20 9A F6           JSR DIMCNTRL    Process lamp dim control
115  F46D  4C 3C F4           JMP TOPLINK1    and do it all again
116
117                    *LINK*******************************************
118                    *
119                    *LINK is the subrouitine which waits for a start bit from the
120                    *lower link end and then inputs the data and subsequently
121                    *outputs the data. The data is transmitted LSB first at 10 usec
122                    *per bit and preceeded by a start bit and followed by two stop
123                    *bits.
124                    *
125                    * Variablies*   Input    Output    Altered
126                    * LNKCNT                              0
127                    * LINKIN        Data
128                    * LINKOUT                Data
129                    * PORTA                             1111111X
130                    *
131                    ***********************************************************
132
133  F470  A9 08     LINK     LDA #$08      Set up to receive 8 data bits
134  F472  85 90              STA LNKCNT
135  F474  A5 01     GENBIT   LDA PORTB     Wait for no start bit
136  F476  30 FC              BMI GENBIT
137  F478  A5 01     GENBIT1  LDA PORTB     Wait for start bit
138  F47A  10 FC              BPL GENBIT1
139  F47C  EA                 NOP           Start bit received, get center of
140  F47D  EA                 NOP           next bit (10 clock cycles)
141  F47E  EA                 NOP
142  F47F  EA                 NOP
143  F480  EA                 NOP
144  F481  EA                 NOP
145  F482  EA                 NOP
146  F483  EA                 NOP
147  F484  EA                 NOP
148  F485  EA                 NOP
149  F486  A5 01     LINK1    LDA PORTB     Get a data bit (3)
150  F488  0A                 ASL A         Move bit 7 to CY
151  F489  66 8E              ROR LINKIN    and form into received byte
152  F48B  C6 90              DEC LNKCNT    One less bit to go
153  F48D  EA                 NOP           make cycle time = bit spacing
154  F48E  D0 F6              BNE LINK1     Done, no, get next bit
155                    * Output data is sent on Bit0 of PortA LSB first
156  F490  A9 01              LDA #$01      Set up to delay 1 bits
157  F492  85 90              STA LNKCNT
158  F494  C6 90     LINK2    DEC LNKCNT
159  F496  D0 FC              BNE LINK2
160  F498  A9 09              LDA #$09      Set up to output 8 bits + start bit
161  F49A  85 90              STA LNKCNT
162  F49C  38                 SEC           Preset start bit
163  F49D  26 8F              ROL LINKOUT
164  F49F  66 8F     LINK3    ROR LINKOUT   Move bit to cy
165  F4A1  2A                 ROL A         then to A
166  F4A2  09 FE              ORA #$FE      Set all upper bits to 1
167  F4A4  85 01              STA PORTB     and output
168  F4A6  C6 90              DEC LNKCNT    Done?
169  F4A8  D0 F5              BNE LINK3     No, output next bit
170  F4AA  A9 FE              LDA #$FE      Leave with stop bits
```

```
171  F4AC  EA                        NOP
172  F4AD  EA                        NOP
173  F4AE  EA                        NOP
174  F4AF  EA                        NOP
175  F4B0  85 01                     STA PORTB      in link transmit
176  F4B2  60                        RTS
177
178
179              *HRXTX**********************************************************
180              *
181              * HRXTX transmits and receives data bits from the handset
182              * and controls the clock to the handset. The interrupts are
183              * inactive during this routine  because the timer is
184              * initialized and the timer interrupt enabled.
185              *
186              ****************************************************************
187  F4B3  78          HRXTX    SEI              Semaphore, turn off interrupts
188  F4B4  A5 9E                LDA SPORTA       Get saved port A state
189  F4B6  29 FD                AND #HCLKOFF     Eliminate old handset TX bit
190  F4B8  05 6B                ORA HTXDATB      Add new handset tx bit
191  F4BA  85 00                STA PORTA
192  F4BC  EA                   NOP
193  F4BD  EA                   NOP
194  F4BE  09 10                ORA #HCLKH       Set clock high
195  F4C0  85 00                STA PORTA        and output it
196  F4C2  85 9E                STA SPORTA       then save it
197  F4C4  A5 00                LDA PORTA        Get handset Rx data
198  F4C6  49 04                EOR #$04         invert it
199  F4C8  29 04                AND #$04         Isolate it
200  F4CA  4A                   LSR A            and move to LSB
201  F4CB  4A                   LSR A
202  F4CC  85 46                STA HRXDATB      and save it
203  F4CE  A9 B5                LDA #$B5         Set up timer
204  F4D0  85 18                STA TIMERLLOW
205  F4D2  A9 07                LDA #$07
206  F4D4  85 1A                STA TIMERLHIT
207  F4D6  A9 10                LDA #$10         Enable counter A
208  F4D8  85 12                STA IER          interrupts
209  F4DA  58                   CLI              Enable main interrupts
210  F4DB  60                   RTS
211
212              *PLNKRX**********************************************************
213              *
214              *
215              *
216              ****************************************************************
217
218  F4DC  A5 91       PLNKRX   LDA MSGCNT       Get message counter
219  F4DE  D0 14                BNE PLNKRX2      Message in progress, yes
220  F4E0  A5 8E                LDA LINKIN       No, mask for start nibble
221  F4E2  29 F0                AND #$F0
222  F4E4  C9 A0                CMP #$A0         Is it start cmd?
223  F4E6  D0 0A                BNE PLNKRX1      No, so exit
224  F4E8  A6 91                LDX MSGCNT       Get message pointer
225  F4EA  A5 8E                LDA LINKIN       Get link input data
226  F4EC  95 92                Sta MSGIN,X      Put in message input buffer
227  F4EE  E8                   INX              Advance message pointer counter
228  F4EF  86 91                STX MSGCNT       and save it
229  F4F1  60                   RTS
230  F4F2  60          PLNKRX1  RTS
231  F4F3  60          PLNKRX1A RTS
232  F4F4  A5 8E       PLNKRX2  LDA LINKIN       Get data
233  F4F6  A6 91                LDX MSGCNT       and buffer pointer
234  F4F8  95 92                STA MSGIN,X      put data in buffer
```

| | | | | | |
|---|---|---|---|---|---|
| 235 | F4FA | E8 | | INX | advance message counter |
| 236 | F4FB | 86 91 | | STX MSGCNT | and save it |
| 237 | F4FD | E0 04 | | CPX #$04 | Is the buffer full? |
| 238 | F4FF | D0 F2 | | BNE PLNKRX1A | No, so exit |
| 239 | F501 | A2 00 | | LDX #$00 | Yes, clear message counter |
| 240 | F503 | 86 91 | | STX MSGCNT | |
| 241 | F505 | A2 01 | | LDX #$01 | Form checksum |
| 242 | F507 | A5 92 | | LDA MSGIN | on first three bytes |
| 243 | F509 | 18 | PLNKRX3 | CLC | without cy |
| 244 | F50A | 75 92 | | ADC MSGIN,X | |
| 245 | F50C | E8 | | INX | |
| 246 | F50D | E0 03 | | CPX #$03 | |
| 247 | F50F | D0 F8 | | BNE PLNKRX3 | |
| 248 | F511 | 49 FF | | EOR #$FF | Invert the Sum |
| 249 | F513 | 29 7F | | AND #$7F | Mask off MSB |
| 250 | F515 | D5 92 | | CMP MSGIN,X | Same as checksum? |
| 251 | F517 | F0 18 | | BEQ PLNKRX6 | Yes, continue process |
| 252 | F519 | A6 43 | | LDX ERRCNT | No, update error |
| 253 | F51B | E0 80 | | CPX #$80 | Should we turn on errbit |
| 254 | F51D | 90 0A | | BCC PLNKRX4 | No |
| 255 | F51F | 78 | | SEI | Yes, but semaphore |
| 256 | F520 | A5 9E | | LDA SPORTA | Turn on port A bit 7 |
| 257 | F522 | 09 80 | | ORA #$80 | |
| 258 | F524 | 85 9E | | STA SPORTA | |
| 259 | F526 | 85 00 | | STA PORTA | |
| 260 | F528 | 58 | | CLI | Done with semaphore |
| 261 | F529 | E0 FF | PLNKRX4 | CPX #$FF | Max count? |
| 262 | F52B | F0 03 | | BEQ PLNKRX5 | Yes, don t add error |
| 263 | F52D | E6 43 | | INC ERRCNT | No, advance error counter |
| 264 | F52F | 60 | | RTS | and exit |
| 265 | F530 | 60 | plnkrx5 | RTS | |
| 266 | F531 | A6 43 | PLNKRX6 | LDX ERRCNT | Time to turn off errbit? |
| 267 | F533 | E0 80 | | CPX #$80 | |
| 268 | F535 | B0 0A | | BCS PLNKRX6A | No |
| 269 | F537 | 78 | | SEI | Yes, semaphore |
| 270 | F538 | A5 9E | | LDA SPORTA | |
| 271 | F53A | 29 7F | | AND #$7F | |
| 272 | F53C | 85 9E | | STA SPORTA | |
| 273 | F53E | 85 00 | | STA PORTA | |
| 274 | F540 | 58 | | CLI | End of semaphore |
| 275 | F541 | E0 00 | PLNKRX6A | CPX #$00 | Minimum count? |
| 276 | F543 | F0 02 | | BEQ PLNKRX7 | Yes, don t change it |
| 277 | F545 | C6 43 | | DEC ERRCNT | Error count = 1 less |
| 278 | F547 | A5 96 | PLNKRX7 | LDA MSGNUM | Update message number |
| 279 | F549 | 85 9D | | STA PMSGNUM | |
| 280 | F54B | A5 92 | | LDA MSGIN | |
| 281 | F54D | 29 0F | | AND #$0F | |
| 282 | F54F | 85 96 | | STA MSGNUM | |
| 283 | F551 | A5 93 | | LDA MSGIN+1 | Get ack message number |
| 284 | F553 | 29 0F | | AND #$0F | |
| 285 | F555 | C5 9B | | CMP MSGOUTNUM | Same as current output message? |
| 286 | F557 | D0 06 | | BNE PLNKRX8 | No, so don t advance |
| 287 | F559 | A5 9B | | LDA MSGOUTNUM | Yes, mark ready for next message |
| 288 | F55B | 09 80 | | ORA #$80 | |
| 289 | F55D | 85 9B | | STA MSGOUTNUM | |
| 290 | F55F | A5 96 | PLNKRX8 | LDA MSGNUM | Same message as before? |
| 291 | F561 | C5 9D | | CMP PMSGNUM | |
| 292 | F563 | F0 19 | | BEQ PLNKRX10 | Yes, exit |
| 293 | F565 | A5 93 | | LDA MSGIN+1 | Get data MSB |
| 294 | F567 | 0A | | ASL A | move it to msb |
| 295 | F568 | 29 80 | | AND #$80 | eliminate remainder |
| 296 | F56A | 05 94 | | ORA MSGIN+2 | add message in byte 2, blank? |
| 297 | F56C | C9 00 | | CMP #$00 | |
| 298 | F56E | F0 0F | | BEQ PLNKRX11 | Yes, exit |

| | | | | | |
|---|---|---|---|---|---|
| 299 | F570 | A6 8C | | LDX HTXFINP | No, put data in handset fifo |
| 300 | F572 | 95 6C | | STA HTXFIFO,X | |
| 301 | F574 | E8 | | INX | Advance pointer |
| 302 | F575 | E0 20 | | CPX #BUFSIZE | Rollover? |
| 303 | F577 | D0 02 | | BNE PLNKRX9 | No, so save it |
| 304 | F579 | A2 00 | | LDX #$00 | Yes, reset to beginning |
| 305 | F57B | 86 8C | PLNKRX9 | STX HTXFINP | |
| 306 | F57D | 60 | | RTS | |
| 307 | F57E | 60 | PLNKRX10 | RTS | exit, same message as before |
| 308 | F57F | 60 | PLNKRX11 | RTS | exit, blank data |
| 309 | | | | | |
| 310 | | | | *HTX************************************************** | |
| 311 | | | | * | |
| 312 | | | | ** | |
| 313 | | | | * | |
| 314 | | | | ************************************************** | |
| 315 | | | | | |
| 316 | F580 | A5 69 | HTX | LDA HTXCNT | Get handset transmit counter |
| 317 | F582 | F0 11 | | BEQ HTX2 | If zero, no TX in progress |
| 318 | F584 | C9 03 | | CMP #$3 | Ready for stop bit? |
| 319 | F586 | 90 06 | | BCC HTXSTOP | Yes, issue stop bits |
| 320 | F588 | 46 6A | | LSR HTXDAT | No, put next bit into cy |
| 321 | F58A | A9 00 | | LDA #$00 | Preset for bit =1 |
| 322 | F58C | B0 02 | | BCS HTX1 | OK |
| 323 | F58E | A9 02 | HTXSTOP | LDA #$2 | Change to bit =0 |
| 324 | F590 | 85 6B | HTX1 | STA HTXDATB | and save for output next clock |
| 325 | F592 | C6 69 | | DEC HTXCNT | one less bit to go |
| 326 | F594 | 60 | | RTS | |
| 327 | F595 | A6 8D | HTX2 | LDX HTXFOUTP | Get pointer to fifo |
| 328 | F597 | E4 8C | | CPX HTXFINP | Anyting in it? |
| 329 | F599 | F0 16 | | BEQ HTXEND | No, so end |
| 330 | F59B | B5 6C | | LDA HTXFIFO,X | Yes, get next byte |
| 331 | F59D | 85 6A | | STA HTXDAT | and save in HTXDAT |
| 332 | F59F | E8 | | INX | Advance pointer |
| 333 | F5A0 | E0 20 | | CPX #BUFSIZE | Rollover? |
| 334 | F5A2 | D0 02 | | BNE HTX3 | No, save it |
| 335 | F5A4 | A2 00 | | LDX #$00 | Yes, reset it to zero |
| 336 | F5A6 | 86 8D | HTX3 | STX HTXFOUTP | Save new index pointer |
| 337 | F5A8 | A9 0A | | LDA #$0A | Set up for 8 data and 2 stop bits |
| 338 | F5AA | 85 69 | | STA HTXCNT | |
| 339 | F5AC | A9 00 | | LDA #$00 | Set up start bit |
| 340 | F5AE | 85 6B | | STA HTXDATB | |
| 341 | F5B0 | 60 | | RTS | |
| 342 | F5B1 | A9 02 | HTXEND | LDA #$02 | Send stop bit |
| 343 | F5B3 | 85 6B | | STA HTXDATB | |
| 344 | F5B5 | 60 | | RTS | |
| 345 | | | | | |
| 346 | | | | *HRX************************************************** | |
| 347 | | | | * | |
| 348 | | | | * | |
| 349 | | | | ************************************************** | |
| 350 | | | | | |
| 351 | F5B6 | A5 44 | HRX | LDA HRXCNT | Is receive in progress? |
| 352 | F5B8 | F0 18 | | BEQ HRXSTRT | No, check for start bit |
| 353 | F5BA | 46 46 | | LSR HRXDATB | Yes, put received bit into cy |
| 354 | F5BC | 66 45 | | ROR HRXDAT | then save it. |
| 355 | F5BE | C6 44 | | DEC HRXCNT | Done all bits? |
| 356 | F5C0 | D0 0F | | BNE HRXEND | No, so exit |
| 357 | F5C2 | A5 45 | | LDA HRXDAT | Yes, get received data |
| 358 | F5C4 | A6 67 | | LDX HRXFINP | Put data into fifo |
| 359 | F5C6 | 95 47 | | STA HRXFIFO,X | |
| 360 | F5C8 | E8 | | INX | Increment fifo input pointer |
| 361 | F5C9 | E0 20 | | CPX #BUFSIZE | Correct if rollover |
| 362 | F5CB | D0 02 | | BNE HRX1 | |

```
363  F5CD  A2 00              LDX #00
364  F5CF  86 67    HRX1      STX HRXFINP
365  F5D1  60       HRXEND    RTS
366  F5D2  A5 46    HRXSTRT   LDA HRXDATB     Start bit received?
367  F5D4  F0 FB              BEQ HRXEND      No, exit
368  F5D6  A9 08              LDA #$08        Yes, set counter for 8 bits
369  F5D8  85 44              STA HRXCNT
370  F5DA  60                 RTS
371
372                 *PLNKTX****************************************************
373                 *
374                 *
375                 ***********************************************************
376
377  F5DB  A6 9C    PLNKTX    LDX OMSGCNT     Is message in progress?
378  F5DD  E0 04              CPX #$04
379  F5DF  B0 08              BCS PLNKTX1     No, get new message
380  F5E1  B5 97              LDA MSGOUT,X    Yes, put next byte from buffer
381  F5E3  85 8F              STA LINKOUT     into LINKOUT.
382  F5E5  E8                 INX             Advance the buffer pointer
383  F5E6  86 9C              STX OMSGCNT
384  F5E8  60                 RTS
385  F5E9  A5 98    PLNKTX1   LDA MSGOUTNUM   Has message been acked?
386  F5EB  10 2E              BPL PLNKTX4     No, repeat it
387  F5ED  18                 CLC             Yes, advance message number
388  F5EE  69 01              ADC #$01
389  F5F0  29 0F              AND #$0F        Eliminate upper 4 bits
390  F5F2  D0 02              BNE PLNKTX2     Is, it zero?
391  F5F4  A9 01              LDA #$01        Yes, set it to one
392  F5F6  85 98    PLNKTX2   STA MSGOUTNUM   and save it
393  F5F8  09 A0              ORA #$A0        Set in start nibble
394  F5FA  85 97              STA MSGOUT      and save in output buffer
395  F5FC  A6 68              LDX HRXFOUTP    Any data for output?
396  F5FE  E4 67              CPX HRXFINP
397  F600  F0 11              BEQ PLNKTX3     No, so send blank data
398  F602  B5 47              LDA HRXFIFO,X   Yes, get the data from fifo
399  F604  85 9F              STA TEMPDATA    save MSB in tempdata
400  F606  29 7F              AND #$7F        mask off MSB
401  F608  85 99              STA MSGOUT+2    and save in message output buffer
402  F60A  E8                 INX             Advance fifo output pointer
403  F60B  E0 20              CPX #BUFSIZE       Rollover?
404  F60D  D0 0C              BNE PLNKTX4     No, so OK
405  F60F  A2 00              LDX #$00        Yes, reset to zero
406  F611  F0 08              BEQ PLNKTX4     Branch always
407  F613  A9 A0    PLNKTX3   LDA #$A0        Set message number to zero
408  F615  85 97              STA MSGOUT      with start nibble
409  F617  A9 00              LDA #$00        Set blank data
410  F619  85 99              STA MSGOUT+2
411  F61B  A5 96    PLNKTX4   LDA MSGNUM      Get current received message number
412  F61D  29 0F              AND #$0F        Upper nible =0
413  F61F  85 98              STA MSGOUT+1    and save it in output buffer
414  F621  A5 00              LDA PORTA       Is horn button pushed?
415  F623  29 0F              AND #HORNMASK
416  F625  F0 0F              BEQ PLNKTX5     Yes, leave horn activated
417  F627  A5 98              LDA MSGOUT+1    No, turn horn bit off
418  F629  09 10              ORA #$10
419  F62B  85 98              STA MSGOUT+1
420  F62D  A5 9F              LDA TEMPDATA    Add MSB of data to MSGOUT+1
421  F62F  4A                 LSR A
422  F630  29 40              AND #$40
423  F632  05 98              ORA MSGOUT+1
424  F634  85 98              STA MSGOUT+1
425  F636  18       PLNKTX5   CLC             Form checksum without carry bit
426  F637  65 97              ADC MSGOUT
```

```
427  F639  18              CLC
428  F63A  65 99           ADC MSGOUT+2
429  F63C  49 FF           EOR #$FF           invert the checksum
430  F63E  29 7F           AND #$7F           and zero MSB
431  F640  85 9A           STA MSGOUT+3       and save it in output message buffer
432  F642  A9 01           LDA #$01           Set output message buffer to 2nd byte
433  F644  85 9C           STA OMSGCNT
434  F646  A5 97           LDA MSGOUT
435  F648  85 8F           STA LINKOUT
436  F64A  60              RTS
437
438  F64B  A9 FE   INIT    LDA #$FE           Set up port B
439  F64D  85 01           STA PORTB
440  F64F  A9 77           LDA #$77           Set up port A
441  F651  85 00           STA PORTA
442  F653  A9 FF           LDA #$FF           Set up FF variables
443  F655  85 02           STA PORTC
444  F657  85 03           STA PORTD
445  F659  85 6B           STA HTXDATB
446  F65B  85 46           STA HRXDATB
447  F65D  85 6A           STA HTXDAT
448  F65F  85 45           STA HRXDAT
449  F661  A9 00           LDA #$00           Set up 00 variables
450  F663  85 8E           STA LINKIN
451  F665  85 8F           STA LINKOUT
452  F667  85 91           STA MSGCNT
453  F669  85 43           STA ERRCNT
454  F66B  85 96           STA MSGNUM
455  F66D  85 90           STA PMSGNUM
456  F66F  85 8D           STA HTXFOUTP
457  F671  85 44           STA HRXCNT
458  F673  85 67           STA HRXFINP
459  F675  85 68           STA HRXFOUTP
460  F677  85 8C           STA HTXFINP
461  F679  85 69           STA HTXCNT
462  F67B  85 9D           STA LNKCNT
463  F67D  A9 04           LDA #$04           Set up output message count finished
464  F67F  85 9C           STA OMSGCNT
465  F681  A9 80           LDA #$80           ACK the current message out number
466  F683  85 9B           STA MSGOUTNUM
467  F685  A0 60           LDY #$60           Activate Handset Reset
468  F687  A9 FE           LDA #$FE           and error light for
469  F689  85 00           STA PORTA          about 60 milliseconds.
470  F68B  A2 FF   INIT1   LDX #$FF
471  F68D  CA      INIT2   DEX
472  F68E  D0 FD           BNE INIT2
473  F690  88              DEY
474  F691  D0 F8           BNE INIT1
475  F693  A9 7F           LDA #$7F           Now turn them both off
476  F695  85 00           STA PORTA
477  F697  85 9E           STA SPORTA
478  F699  60              RTS
479
480                *DIMCNTRL***************************************************
481                *                                                          *
482                *                                                          *
483                *                                                          *
484                ***********************************************************
485
486  F69A  C6 41   DIMCNTRL DEC DIMSWCNT       10 msec yet?
487  F69C  F0 01            BEQ DIM1           Yes, process dim control
488  F69E  60               RTS                No, so exit
489  F69F  A9 05   DIM1     LDA #$05           Reset DIMSWCNT for 10 more msec.
490  F6A1  85 41            STA DIMSWCNT
491  F6A3  A5 40            LDA DIMCNT         Is dim in progress?
```

```
492  F6A5  F0 0E              BEQ  DIM3        No, process switch
493  F6A7  C6 40              DEC  DIMCNT      Yes, are we done?
494  F6A9  F0 01              BEQ  DIM2        Done, so turn it off
495  F6AB  60                 RTS              Not done, so exit
496  F6AC  78       DIM2      SEI              working with interrupts
497  F6AD  A5 9E              LDA  SPORTA      semaphore, get saved port A
498  F6AF  09 08              ORA  #DIMBIT     Turn off handset dim control pulse
499  F6B1  85 9E              STA  SPORTA
500  F6B3  58                 CLI
501  F6B4  60                 RTS
502  F6B5  A5 00    DIM3      LDA  PORTA       Get the dim switch
503  F6B7  29 40              AND  #DIMSW
504  F6B9  F0 0A              BEQ  DIM5        Is it active? Yes, process dim switch
505  F6BB  A5 42              LDA  DIMSWFLG    Not active, was it before?
506  F6BD  D0 01              BNE  DIM4        Yes, so turn off the dim flag
507  F6BF  60                 RTS
508  F6C0  A9 00    DIM4      LDA  #$00        Yes, turn off the dimflag
509  F6C2  85 42              STA  DIMSWFLG
510  F6C4  60                 RTS
511  F6C5  A5 42    DIM5      LDA  DIMSWFLG    Was it active before?
512  F6C7  F0 01              BEQ  DIM6        No, so activate it
513  F6C9  60                 RTS              Yes, so exit
514  F6CA  A9 06    DIM6      LDA  #$06        Set dim counter for 60 msec.
515  F6CC  85 40              STA  DIMCNT
516  F6CE  78                 SEI              semaphore
517  F6CF  A5 9E              LDA  SPORTA      Turn off dimpulse
518  F6D1  29 F7              AND  #$F7
519  F6D3  85 9E              STA  SPORTA
520  F6D5  58                 CLI              Reenable interrupts
521  F6D6  A9 80              LDA  #$80        Turn on dim switch flag
522  F6D8  85 42              STA  DIMSWFLG
523  F6DA  60                 RTS

*INTR*****************************************************
         *
         *
         *****************************************************

531  F6DB  48       INTR      PHA              Save accumulator
532  F6DC  A5 9E              LDA  SPORTA      Turn off handset clock
533  F6DE  29 EF              AND  #$EF
534  F6E0  85 00              STA  PORTA
535  F6E2  85 9E              STA  SPORTA
536  F6E4  A9 00              LDA  #$00        Turn off timer A int.
537  F6E6  85 12              STA  IER
538  F6E8  68                 PLA              Restore Accumulator
539  F6E9  40       NMI       RTI              and return

541  FFFA                     ORG  VECTORS

543  FFFA  E9 F6              WORD NMI
544  FFFC  34 F4              WORD TOPLINK
545  FFFE  DB F6              WORD INTR
```

What is claimed is:

1. A powered communication link between a central controller and a remote substation comprising a single conductor having a movable or intermittent contact interacting between the central controller and the remote substation and further comprising:

(a) power supply means located at the central controller for supplying electrical power over said conductor to said remote substation;

(b) electrical power storage means at said remote substation for storing the electrical power supplied over said conductor;

(c) data collection means at said remote substation powered by said electrical storage means;

(d) computer means at said central controller for periodically stopping the application of electrical power to said conductor and for sending data to and receiving data from said remote substation, wherein said remote substation includes computer means for sending data to and receiving data from said central controller; and (e) pull-up network means at both said remote substation and said central controller operative upon the removal of power from said conductor for raising the potential of said conductor except in the presence of data thereon to prevent false triggering of said computer means.

2. The powered communication link of claim 1, further including energy monitoring means at said remote substation for monitoring the level of energy stored in said electrical energy storage means and for increasing the amount of energy supplied over said conductor per unit of time when said energy level drops below a predetermined threshold.

3. The powered communication link of claim 1 wherein said central controller and said remote substation both include microprocessor means coupled to said conductor through respective receiver and transmitter circuits for receiving and transmitting digital data between said remote substation and said central controller.

4. The powered communication link of claim 3 wherein said central controller includes timer means for resetting the microprocessor of said central controller when communication between said central controller and said remote substation is interrupted.

5. The powered communication link of claim 4 wherein said timer means is periodically pulsed by timing pulses from said microprocessor in said central controller and provides a reset signal thereto in the absence of said timing pulses within a predetermined period of time.

6. A powered communication link between a central controller and a remote substation comprising a single conductor having a movable or intermittent contact interacting between the central controller and the remote substation and further comprising:

(a) power supply means located at the central controller for supplying electrical power over said conductor to said remote substation;

(b) electrical power storage means at said remote substation for storing the electrical power supplied over said conductor;

(c) multiplexing means at said central controller for periodically stopping the application of electrical power to said conductor to permit transmitter means located at the remote substation to send data over said conductor to said central controller; and (d) switching means including voltage level sensing means coupled to said conductor for connecting said conductor to said electrical power storage means when electrical pulses of a predetermined voltage level are being supplied over said conductor and for disconnecting said storage means from said conductor when said data is being transmitted.

7. The powered communication link of claim 6, further including receiver/transmitter means at said remote substation for receiving data from and for sending data to said central controller.

8. The powered communication link of claim 7, further including pull-up network means operative upon an interruption of electrical power from said conductor for raising the potential of said conductor to prevent a false data indication.

9. The powered communication link of claim 6, further including monitoring means for said electrical power storage means for monitoring the amount of energy stored therein and for providing an output signal when the energy level in such storage means drops below a predetermined threshold.

10. The powered communication link of claim 9 wherein said central controller further comprises data processing means responsive to said output for increasing the power supplied over said conductor until the energy level in said electrical power storage means exceeds said predetermined threshold.

11. The powered communication link of claim 6 wherein said central controller further includes microprocessor means connected to timing means, said timing means being responsive to a periodic pulse from said microprocessor means in the absence of said periodic pulse for a preset time interval.

12. A powered communication link between a central controller and a remote substation comprising a single conductor having a movable or intermittent contact interacting therebetween, wherein said remote substation is powered by pulses of electrical power supplied by the central controller over the conductor, said pulses alternating with data messages transmitted between said central controller and said remote substation over said conductor, and including auxiliary signalling means for generating an alarm signal actuated by a switch at the remote substation mormally providing said alarm signal to the central controller over the conductor as part of a data message, and failsafe relay means at the remote substation triggered by a loss of electrical power for connecting said auxiliary signalling means directly to said conductor in the event of a loss of electrical power at said remote substation to generate said alarm signal independently of said data message.

13. The powered communication link of claim 12 including transmitter means at the remote substation for transmitting a data bit representing the status of said switch as a portion of a data message.

14. The powered communication link of claim 13, further including receiver means at said central controller for receiving said data bit and for turning on an indicator device when said switch is closed.

15. The communication link of claim 14 further including second relay means at said central controller for connecting said indicator device directly to said link in the event of a communications malfunction resulting in the loss of said data bit.

16. The communication link of claim 15 wherein said indicator device includes third relay means for energizing said indicator device, said third relay means being connected to said conductor through said second relay means.

17. The communication link of claim 16, further including clock network means responsive to said receiver means for energizing said third relay means upon the receipt of said data bit indicating that said switch is closed.

* * * * *